(12) United States Patent
Kim et al.

(10) Patent No.: US 12,169,422 B2
(45) Date of Patent: Dec. 17, 2024

(54) SELF-RETRACTING DISPLAY DEVICE AND TECHNIQUES FOR PROTECTING SCREEN USING DROP DETECTION

(71) Applicant: APPLE INC., Cupertino, CA (US)

(72) Inventors: Hoon Sik Kim, San Jose, CA (US); Michael B. Wittenberg, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 5 days.

(21) Appl. No.: 17/649,787

(22) Filed: Feb. 2, 2022

(65) Prior Publication Data
US 2023/0079485 A1 Mar. 16, 2023

Related U.S. Application Data

(60) Provisional application No. 63/244,131, filed on Sep. 14, 2021.

(51) Int. Cl.
G06F 1/16 (2006.01)
G09F 9/33 (2006.01)

(52) U.S. Cl.
CPC .......... *G06F 1/1652* (2013.01); *G06F 1/1679* (2013.01); *G06F 1/1681* (2013.01); *G09F 9/335* (2021.05); *G06F 2200/1633* (2013.01); *G06F 2200/1637* (2013.01)

(58) Field of Classification Search
CPC .... G06F 1/1652; G06F 1/1679; G06F 1/1681; G06F 2200/1633; G06F 2200/1637; G09F 9/335
See application file for complete search history.

(56) References Cited

U.S. PATENT DOCUMENTS

| 10,585,708 | B1 | 3/2020 | Wilson et al. | |
|---|---|---|---|---|
| 2003/0073456 | A1* | 4/2003 | Griffin | H04M 1/0245 455/566 |
| 2013/0035110 | A1* | 2/2013 | Sridhara | H04W 4/029 455/456.1 |
| 2016/0231785 | A1 | 8/2016 | Vartanian | |
| 2019/0069451 | A1 | 2/2019 | Myers et al. | |
| 2020/0161288 | A1 | 5/2020 | Bibl et al. | |
| 2021/0405703 | A1* | 12/2021 | Song | G06F 1/1694 |
| 2021/0405708 | A1* | 12/2021 | Wang | G06F 1/1637 |

FOREIGN PATENT DOCUMENTS

CN 112230827 A * 1/2021 ........... G06F 1/1616

* cited by examiner

*Primary Examiner* — Towfiq Elahi
(74) *Attorney, Agent, or Firm* — Kilpatrick Townsend & Stockton LLP

(57) ABSTRACT

In some aspects, mobile devices with foldable and rollable displays can use a sensor to detect vertical acceleration with respect to the ground to determine if the mobile device has been dropped. If the sensor detects that the mobile device has been dropped the foldable device can fold or retract at least partially to afford protection from the fragile display from striking the ground. Even folding the display to an angle less than 180 degrees can afford some protection because the mobile device can strike edges of the mobile device instead of the display itself. In various embodiments, a rollable device can retract the display if predetermined acceleration limits are exceeded.

13 Claims, 21 Drawing Sheets

SELF-RETRACTING DISPLAY DEVICE AND TECHNIQUES FOR PROTECTING SCREEN USING DROP DETECTION

CROSS-REFERENCES TO RELATED APPLICATIONS

This application claims priority to and the benefit of U.S. Provisional Patent Application No. 63/244,131, filed Sep. 14, 2021, entitled "Self-Retracting Display Device And Techniques For Protecting Screen Using Drop Detection" hereby incorporated by reference it in their entirety and for all purposes.

BACKGROUND

Mobile devices with thin-screen displays may be vulnerable if the display strikes the ground after dropping. Certain foldable displays and rollable displays can be especially vulnerable due to use of ultra-thin glass displays which can be especially vulnerable. It would be advantageous to detect when a device is falling to implement protection features to

BRIEF SUMMARY

Mobile devices with foldable and rollable displays can use a sensor to detect vertical acceleration (e.g., acceleration with respect to the ground) to determine if the mobile device has been dropped. If the sensor detects that the mobile device has been dropped the foldable device can retract at least partially to afford protection from the fragile display from striking the ground. Even folding the display to an angle less than 180 degrees can afford some protection because the mobile device can strike edges of the mobile device instead of the display itself. In various embodiments, a rollable device can retract the display if predetermined acceleration limits are exceeded.

In an aspect an electronic device can include a first display coupled to a second display via a hinged connection. In various embodiments, the first display and the second display can each be portions of a foldable display. The sensor used to detect vertical acceleration can be an accelerometer (e.g., as part of an inertial measure unit (IMU)). If the vertical acceleration exceeds a predetermined threshold, a release mechanism operating with a hinged connection can be used to reduce the angle between the first display and the second display below a threshold angle when the predetermined acceleration threshold is exceeded. In various embodiments, the threshold angle can be less than 180 degrees.

In various embodiments, the release mechanism can include a motorized hinge. In other embodiments, the release mechanism can include a mechanical hinge with a spring-loaded detent.

The first display or the second display can be a light emitting diode display such as an organic light emitting diode display.

In an aspect, an electronic device can include a foldable display coupled on one edge of the foldable device to a roller. The electronic device can include an acceleration sensor configured to detect a vertical acceleration of the electronic device exceeding a predetermined vertical acceleration threshold. The acceleration sensor can be an inertial measurement unit. The electronic device can include a release mechanism operating with the roller to automatically retract the foldable display on the roller when the detected vertical acceleration exceeds a predetermined acceleration threshold.

In various embodiments, the release mechanism comprises a motorized hinge. In other embodiments, the release mechanism comprises a mechanical hinge with a spring-loaded detent.

In various embodiments the foldable display can include a substrate including a first side and a second side, a first wiring layer on the first side, an array of LEDs on and in electrical contact with the first wiring layer on the first side of the substrate, and a second wiring layer on the second side of the substrate. The array of LEDs can include both inorganic LEDs and organic LEDs. The foldable display can include a plurality of interconnects extending between and electrically connecting the first wiring layer to the second wiring layer.

In various embodiments, the foldable display can include an array of microchips connected with the first wiring layer to drive the array of LEDs. Each microchip can be connected with a corresponding plurality of LEDs.

In an aspect, a method can include detecting a vertical acceleration of an electronic device. The method can include comparing a value of the vertical acceleration of the electronic device against a predetermined threshold. The method can include activating a release mechanism for a hinged connection between a first display and a second display of the electronic device when the vertical acceleration exceeds a predetermined threshold, wherein the activating reduces an angle between the first display and the second display below a threshold angle.

In various embodiments, the release mechanism comprises a motorized hinge. In various embodiments, the release mechanism comprises a mechanical hinge with a spring-loaded detent.

In various embodiments, the threshold angle is less than 180 degrees. In various embodiments, the first display or the second display is an organic light emitting diode display. The first display and the second display can each comprise regions of a foldable display.

A better understanding of the nature and advantages of embodiments of the present disclosure may be gained with reference to the following detailed description and the accompanying drawings.

BRIEF DESCRIPTION OF THE DRAWINGS

Like reference, symbols in the various drawings indicate like elements, in accordance with certain example implementations. In addition, multiple instances of an element may be indicated by following a first number for the element with a letter or a hyphen and a second number.

DETAILED DESCRIPTION

Modern mobile devices can include foldable or rollable displays. In various embodiments, the foldable display can include two screens coupled together via a hinged connection that can be operated together to form a larger display. In various embodiments, the display can be constructed from flexible materials that can be flexed about a bend axis.

Figure 1:
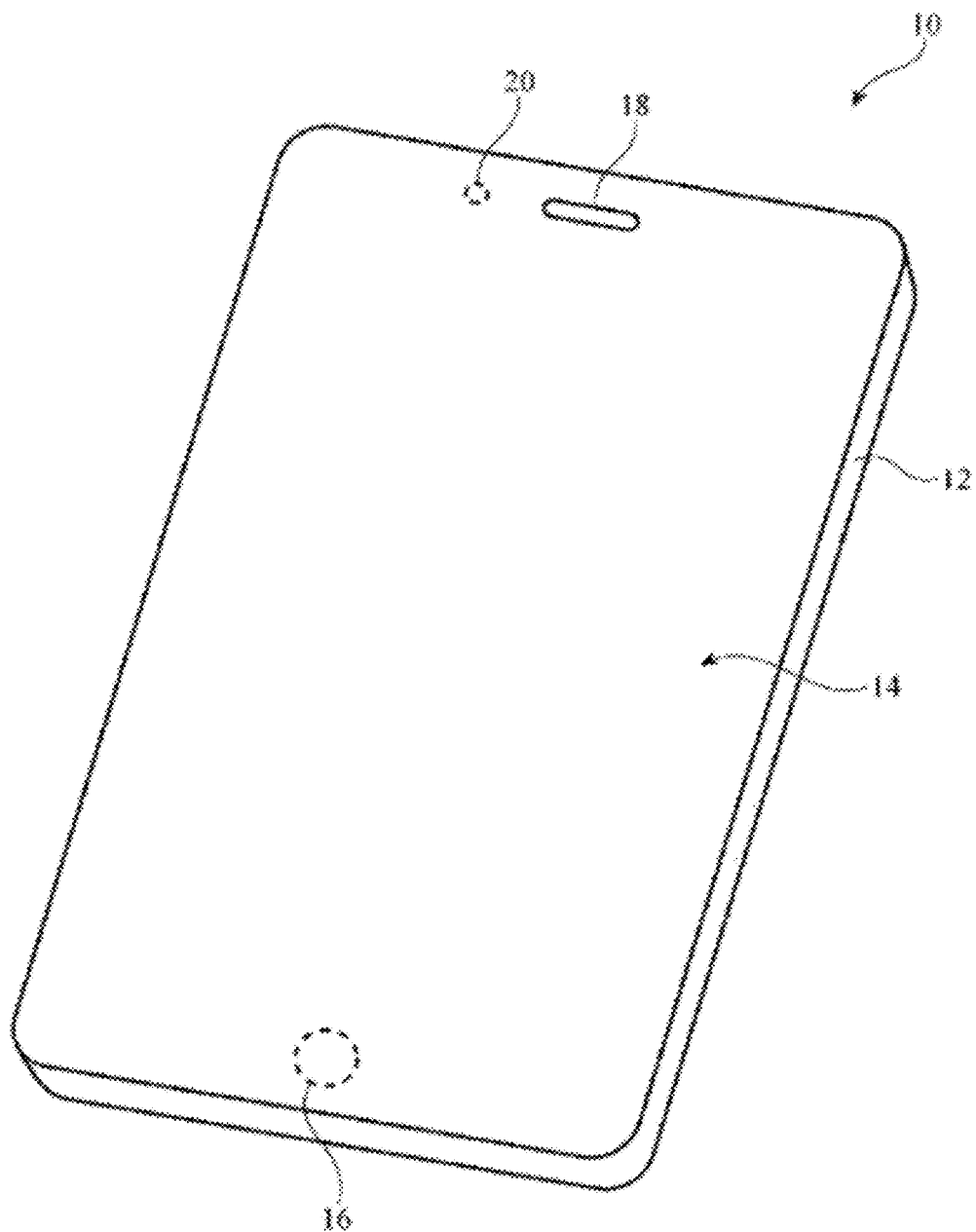
FIG. 1 is a perspective view of an illustrative electronic device in accordance with an embodiment.

An illustrative electronic device of the type that may be used in a system with multiple electronic devices is shown in FIG. 1. Electronic device 10 may be a computing device such as a laptop computer, a computer monitor containing an embedded computer, a tablet computer, a cellular telephone, a smart phone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 1, device 10 is a portable device such as a smart phone, cellular telephone, media player, tablet computer, or other portable computing device. Other configurations may be used for device 10 if desired. The example of FIG. 1 is merely illustrative.

In the example of FIG. 1, device 10 has opposing front and rear faces and peripheral sidewalls that run around the periphery of device 10. Device 10 includes a display such as display 14 on the front face of device 10 mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may have vertical sidewalls, curved sidewalls, sidewalls with one or more beveled (angled) portions, sidewalls that are uncovered by display 14, sidewalls that are partly or fully covered by portions of display 14, and/or other suitable sidewall structures. The rear face of device 10 may be covered with housing 12. Configurations in which a display such as display 14 is formed on the rear face of housing 12 (e.g., in addition to display 14 on the front face of device 10) may also be used.

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 14 may include an array of display pixels formed from liquid crystal display (LCD) components, an array of electrophoretic display pixels, an array of plasma display pixels, an array of organic light-emitting diode display pixels or other light-emitting diodes, an array of electrowetting display pixels, or display pixels based on other display technologies.

Display 14 may be protected using a display cover layer such as a layer of transparent glass or clear plastic. Openings may be formed in the display cover layer. For example, an opening may be formed in the display cover layer to accommodate optional speaker port 18. Openings may also be formed in housing 12 to form communications ports (e.g., an audio jack port, a digital data port, etc.), to form openings for buttons, etc. If desired, a touch sensor, fingerprint sensor, dome-switch button or other input device such as input device 16 may be formed on the front face of device 10 (e.g., within an opening in the display cover layer, under the display cover layer in a configuration in which the display cover layer does not contain any button openings, etc.).

Display 14 may have an active area and an inactive area. The active area may, as an example, be formed in a rectangular central portion of the front face of device 10. The active area contains pixels that display images for a user of device 10. Inactive border regions (areas without pixels) may be formed along one or more of the edges of the active area. For example, the active area may be bordered on the left and right and top and bottom by inactive display areas. In other configurations, the active area of display 14 may cover all of the front face of device 10, may cover the front face of device 10 and some or all of the sidewalls of device 10, may have inactive borders at the upper and lower ends of device 10 while being borderless along the left and right edges of device 10, or may have other layouts.

Components such as light sensors (e.g., light-sensors in proximity sensors, ambient light sensors, etc.), cameras (e.g., digital image sensors that capture images), status indicator lights (e.g., light-emitting diodes), and other components may be mounted under windows in display 14 such as windows 20 or other portions of device 10. Sensors such as proximity sensor light sensors may be mounted under a layer of visible-light-blocking and infrared-light-transparent material. Sensors such as ambient light sensors and other components that use visible light such as cameras and status indicator lights may be mounted under windows that are transparent to visible light. Light-based components such as these may also be mounted on the rear face of device 10, on device sidewalls, or in other portions of structures of device 10.

Figure 2:
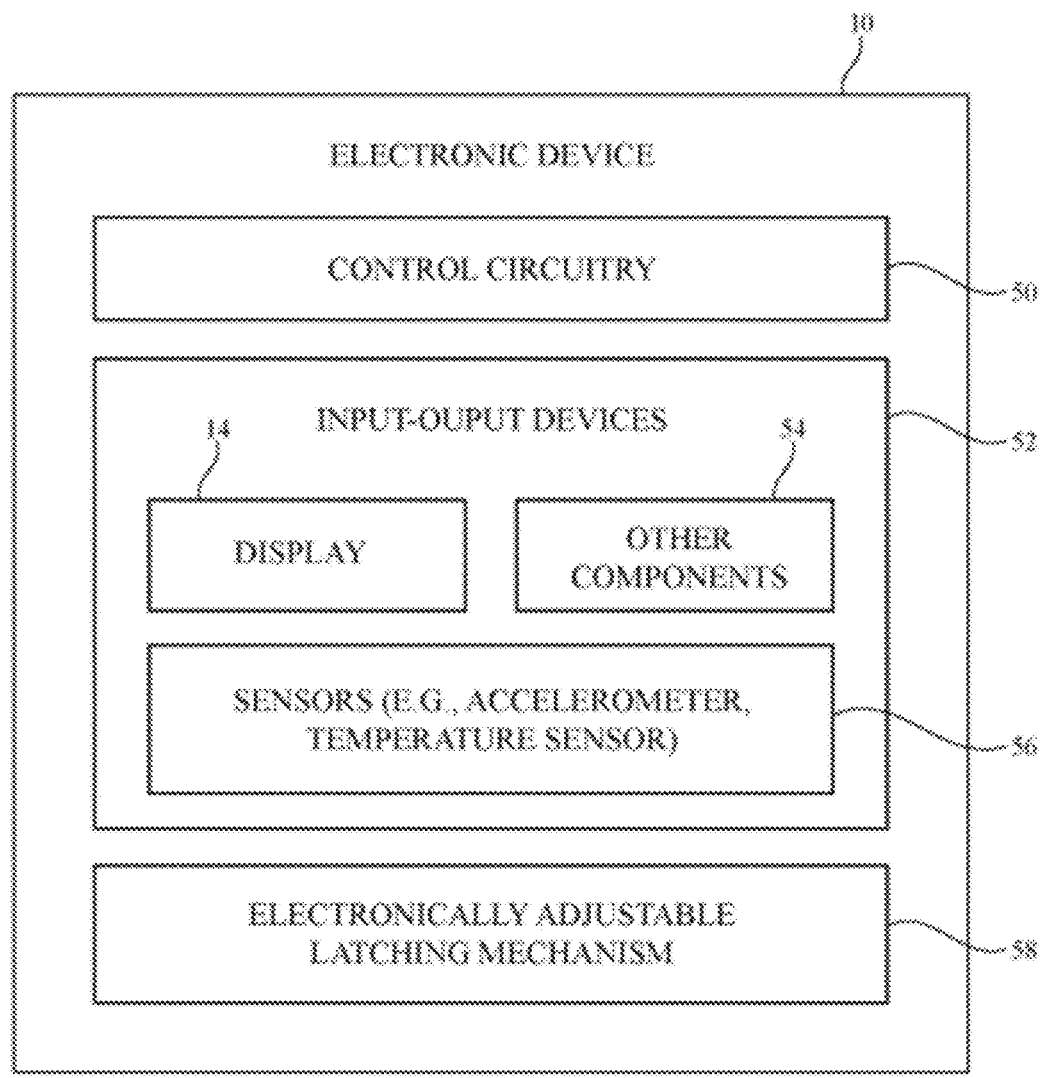
FIG. 2 is a schematic diagram of an illustrative electronic device in accordance with an embodiment.

A schematic diagram of an illustrative electronic device such as device 10 of FIG. 1 is shown in FIG. 2. As shown in FIG. 2, electronic device 10 may have control circuitry 50. Control circuitry 50 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 50 may be used to control the operation of device 10 (e.g., to process sensor signals and other input and to control adjustable components such as a display, a heating element, etc.). The processing circuitry may be based on one or more microprocessors, microcontrollers, digital signal processors, baseband processors, power management units, audio chips, application specific integrated circuits, etc.

Input-output circuitry in device 10 such as input-output devices 52 may be used to allow data to be supplied to device 10 and to allow data to be provided from device 10 to external devices. As shown in FIG. 2, input-output devices 52 may include display 14. Display 14 may be a touch screen that incorporates a two-dimensional touch sensor or may be insensitive to touch. A two-dimensional touch sensor for display 14 may be formed from an array of capacitive touch electrodes touch sensor or other touch sensor components (e.g., force sensors, resistive touch sensors, acoustic touch sensors, optical sensors, etc.).

Input-output devices 52 may include sensors 56. Sensors 56 may include a capacitive proximity sensor, a light-based proximity sensor, a magnetic sensor, a force sensor such as a force sensor that gathers user input, a touch sensor for gathering user touch input, a temperature sensor, a pressure sensor, an ambient light sensor, a microphone or other sound sensor that gathers ambient noise measurements and user input such as voice commands, sensors for gathering data on device position and motion such as inertial measurement units that include accelerometers, compasses, and/or gyroscopes, and/or other sensors.

Input-output devices 52 may also include other components 54 such as buttons, joysticks, scrolling wheels, touch pads, key pads, keyboards, speakers, tone generators, vibrators, cameras, light-emitting diodes and other status indicators, data ports, etc. A user can control the operation of device 10 by supplying user input commands through input-output devices 52 and may receive status information and other output from device 10 using the output resources of input-output devices 52.

Input-output devices 28 may include status-indicator lights (e.g., light-emitting diodes), light-emitting diodes for providing camera flash illumination and other light, buttons, joysticks, scrolling wheels, key pads, keyboards, audio components 34 such as microphones and speakers (e.g., an ear speaker located at an upper end of device 10 and/or one or more speaker-phone speakers at an opposing lower end of device 10 or elsewhere in device 10 that are used to play audio when device 10 is being held away from a user's head), tone generators, haptic devices such as vibrators, cameras such as camera 30 (e.g., front-facing and/or rear-facing cameras), sensors 32, displays such as display 14, and other input-output components that gather input and provide output from device 10. Input-output devices 28 (e.g., sensors 32) may include touch sensors (e.g., stand-alone touch sensors for touch sensitive buttons and track pads and/or touch sensor panels that overlap display 14 and are used in gathering touch screen input from a user as selectable on-screen options are displayed on display 14). Sensors 32 may also include light sensors, orientation sensors (e.g., accelerometers, gyroscopes, compasses, and/or other components that can detect device motion and/or device orientation such as device orientation relative to the Earth), resistance sensors (e.g., sensors that can detect contact by a conductive sidewall of another device or other external object), switch-based sensors, capacitance sensors, proximity sensors (e.g., a capacitive proximity sensor and/or a light-based proximity sensor such as an infrared proximity sensor that makes proximity sensor measurements by emitting infrared light from an infrared light-emitting diode and measuring corresponding reflected light using an infrared light detector), magnetic sensors, force sensors (e.g., force sensors based on a capacitive force sensing arrangement, strain gauges, piezoelectric force sensors, and/or other transducers that convert force into electrical signals), gas pressure sensors (e.g., sensors for measuring air pressure), gas sensors (e.g., carbon dioxide sensors), particulate sensors, moisture sensors, a connector port sensor or other sensor that determines whether first device 10 is mounted in a dock, and other sensors and input-output components.

Control circuitry 50 may be used to run software on device 10 such as operating system code and applications. During operation of device 10, the software running on control circuitry 50 may display images on display 14 (e.g., video, still images such as text, alphanumeric labels, photographs, icons, other graphics, etc.) using an array of pixels in display 14. In self-heating arrangements, control circuitry 50 can use display 14 to display patterns of light (e.g., images or other patterns of light) that heat portion 14B of display. For example, control circuitry 50 can direct the pixel array in display 14 to illuminate some or all of the pixels in portion 14B so that heat generated by the illuminated pixels will heat portion 14B.

Control circuitry 50 may be configured to execute instructions for implementing desired control and communications operations in device 10 and systems including multiple devices such as device 10. For example, control circuitry 50 may be used in processing sensor data, processing user input, processing information received via wireless communications circuitry, and/or other information to determine when to operate device 10 in an independent mode or in a joint operating mode with other devices and to determine which capabilities device 10 and/or other devices should be provided with during these operating modes.

Control circuitry 50 may perform these operations using hardware (e.g., dedicated hardware or circuitry) and/or software code (e.g., code that runs on the hardware of device 10 such as control circuitry 50). Software code may be stored on non-transitory computer readable storage media (e.g., tangible computer readable storage media). The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, other computer readable media, or combinations of these computer readable media or other storage. Software stored on the non-transitory computer readable storage media may be executed on the processing circuitry of control circuitry 50 during operation.

In some configurations for device 10, device 10 may include an electrically adjustable latching mechanism such as latching mechanism 58. Latching mechanism 58 may be engaged when it is cold and portion 14B is therefore sensitive to bending stress (e.g., when adhesive or other materials in portion 14B have become stiff from the cold and susceptible to damage if flexed). By engaging latching mechanism whenever portion 14B is cold to prevent device 10 from being unfolded, undesired damage to portion 14B can be avoided. Latching mechanism 58 may be disengaged when the temperature of portion 14B is sufficiently high to avoid damage during bending.

Device 10 may have input-output circuitry 24. Input-output circuitry 24 may be configured to gather input from users, external devices, and the surrounding environment and may be configured to supply output to users, external devices, and the surrounding environment. As shown in FIG. 2, input-output circuitry 24 may include communications circuitry 26 and input-output devices 28.

Communications circuitry 26 may include transceiver circuitry (transmitters and/or receivers) for supporting wired and wireless communications. For example, communications circuitry 26 may support data communications between device 10 and another electronic device over a serial or parallel data path. Device 10 may have communications ports (e.g., Universal Serial Bus ports, etc.) for receiving mating data cables. The data cables can be used to carry data between device 10 and other electronic equipment (e.g., peer devices, etc.).

Communications circuitry 26 may include also wireless communications circuitry for communicating wirelessly with external equipment. The wireless communications circuitry may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Communications circuitry 26 may include radio-frequency transceiver circuitry for handling various radio-frequency communications bands. For example, circuitry 26 may include transceiver circuitry that transmits and receives data in 2.4 GHz and 5 GHz bands for Wi-Fi® (IEEE 802.11) communications and the 2.4 GHz Bluetooth® communications band. Circuitry 26 may include cellular telephone transceiver circuitry for handling wireless communications in frequency ranges such as a low communications band from 700 to 960 MHz, a midband from 1710 to 2170 MHz, and a high band from 2300 to 2700 MHz or other communications bands between 700 MHz and 2700 MHz or other suitable frequencies (as examples). Circuitry 26 may handle voice data and non-voice data. Wireless communications circuitry in circuitry 26 can include circuitry for other short-range and long-range wireless links if desired. For example, circuitry 26 may include millimeter wave communications circuitry (e.g., circuitry for supporting 60 GHz communications and communications in other millimeter wave bands), circuitry for receiving television and radio signals, paging system transceivers, near field communications (NFC) circuitry, etc. Circuitry 26 may also include global positioning system (GPS) receiver equipment for receiving GPS signals at 1575 MHz or for handling other satellite positioning data. In WiFi® and Bluetooth® links and other short-range wireless links, wireless signals are typically used to convey data over tens or hundreds of feet. In cellular telephone links and other long-range links, wireless signals are typically used to convey data over thousands of feet or miles.

Communications circuitry 26 may include one or more antennas. These antennas may be located at one or both ends of device 10, along the sides of device 10, at the corners of device 10, in the middle of the rear face of device 10, and/or at other locations within housing 12. Antennas for device 10 may be formed using any suitable antenna types. For example, antennas in circuitry 26 may include antennas with resonating elements that are formed from loop antenna structures, patch antenna structures, inverted-F antenna structures, slot antenna structures, planar inverted-F antenna structures, helical antenna structures, hybrids of these designs, etc. Different types of antennas may be used for different bands and combinations of bands. For example, one type of antenna may be used in forming a local wireless link antenna and another type of antenna may be used in forming a remote wireless link antenna. Device 10 may include impedance measurement sensors (e.g., impedance measurement circuitry that measures the impedance of antennas and/or other radio-frequency components in circuitry 26). These sensors may be used by the control circuitry of device 10 in detecting when external objects are in the vicinity of device 10 (e.g., when part of device 10 is being held in the hand of a user, when part of device 10 such as an edge of device 10 is adjacent to another electronic device, etc.).

Figure 3:
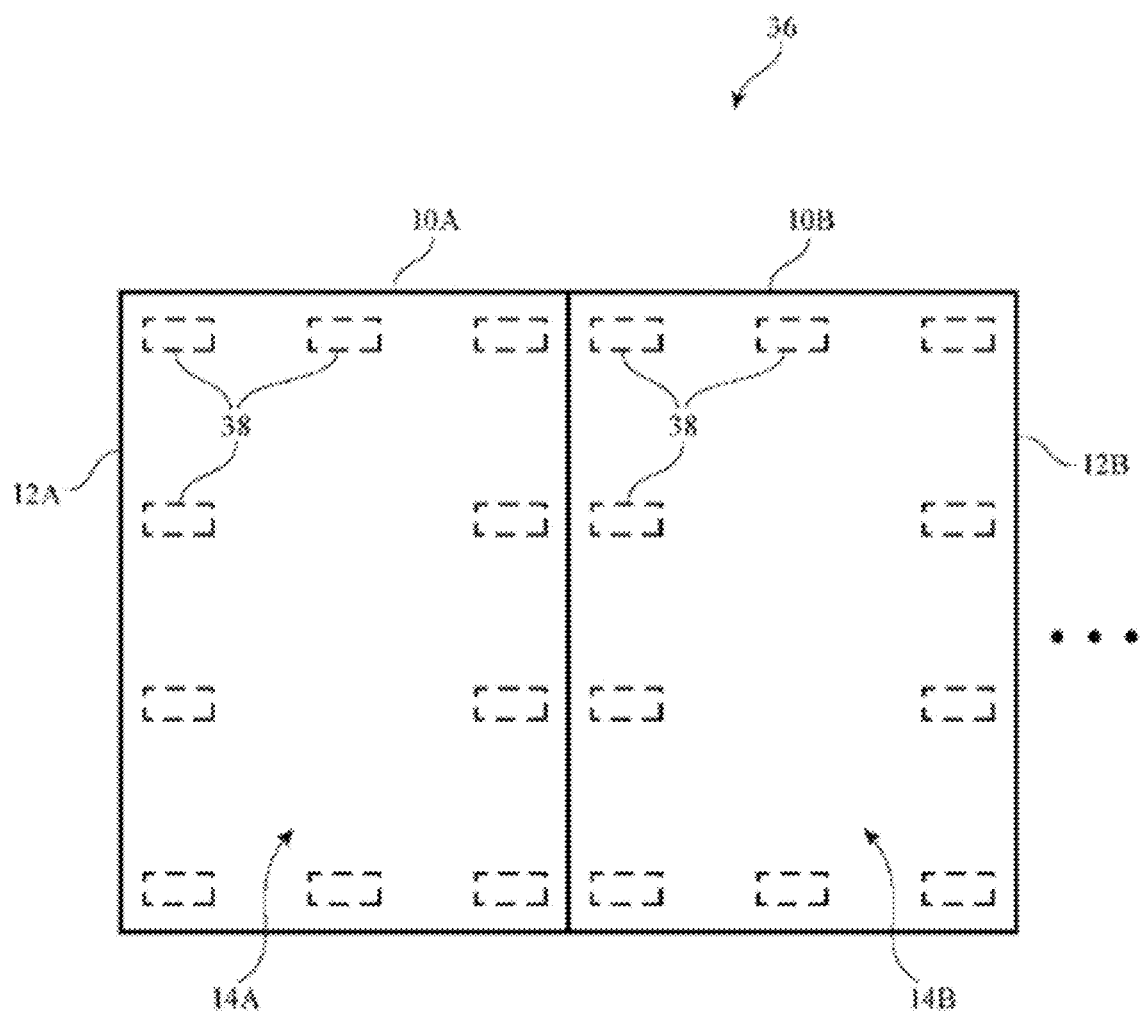
FIG. 3 is a diagram of a pair of adjacent electronic devices in accordance with an embodiment.

Devices such as device 10 can be used in isolation or, when brought into the vicinity of additional devices such as device 10 can be used in joint operating modes. An illustrative system in which two electronic devices have been placed adjacent to each other for use in a joint operating mode is shown in FIG. 3. As shown in FIG. 3, system 36 may include multiple electronic devices such as device 10 of FIGS. 1 and 2. System 36 may, as an example, include a pair of devices, two or more devices, three or more devices, four or more devices, five or more devices, 2-4 devices, fewer than five devices, fewer than four devices, or other suitable number of electronic devices 10.

In the example of FIG. 3, system 36 includes first electronic device 10A and second electronic device 10B. Devices 10A and 10B may be peer devices (e.g., devices 10A and 10B may both be cellular telephones, may both be wristwatch devices, may both be tablet computers, may both be laptop computers, may both be desktop computers, etc.) or devices 10A and 10B may be different types of devices. For example, device 10A may be a tablet computer and device 10B may be a cellular telephone, device 10A may be a laptop computer, and device 10B may be a tablet computer, device 10A may be a cellular telephone and device 10B may be a wrist watch device, etc. In some configurations, devices 10A and 10B are of the same general type but have individual differences (e.g., devices 10A and 10B may be different cellular telephone models). Configurations for system 36 in which devices 10A and 10B have the same size and shape may sometimes be described herein as an example. This is however, merely illustrative. Devices 10A and 10B may have different shapes (e.g., outlines when viewed from the front that are circular, oval, triangular, hexagonal, rectangular, etc.) and/or may have different sizes (e.g., device 10A may have a housing 12 and/or a display 14 that is larger or smaller than the housing and/or display of device 10B, etc.).

As shown in FIG. 3, devices 10A and 10B may be oriented on a tabletop or other surface so that devices 10A and 10B are adjacent (e.g. so that one or more edges of housing 12A of device 10A abuts one or more edges of housing 12B of device 10B). In the example of FIG. 3, the right-hand edge of housing 12A is aligned with and touching a corresponding left-hand edge of housing 12B, so that display 14A of device 10A and display 14B of device 10B can effectively form a single larger display and so that other resources of devices 10A and 10B can be used together. Other arrangements in which devices 10A and devices 10B are placed adjacent to each other (e.g., so that the housing sidewall along the periphery of one device abuts at least some of the housing sidewall along the periphery of another device) can be used, if desired.

Devices 10A and 10B may contain components 38 that are located within housings 12A and 12B. Components 38 may be located along one or more edge of devices 10A and 10B and/or may be located elsewhere within the housings of devices 10A and 10B. For example, one or more components 38 may be located along each peripheral edge of devices 10A and 10B so that sensing circuitry associated with components 38 can detect external objects around the periphery of each device (e.g. by making sensor measurements through sidewalls of housing 12 or through other portions of housing 12). In some configurations, components 38 may make sensor measurements through display 14.

If desired, components 38 may include magnetic components such as permanent magnets, electromagnets, and/or magnetic materials such as iron that are attracted to permanent magnets and electromagnets. These magnetic components help hold devices 10A and 10B adjacent to each other. If desired, components 38 and/or the housings of devices 10A and 10B may include interlocking male and female parts (e.g., pins and holes, interlocking grooves, or other engagement structures) that help hold devices 10A and 10B in desired positions relative to each other. Devices 10A and 10B may also be supported by removable sleeves, plastic or leather cases, covers that fold or bend, and/or other supporting structures.

Components 38 may include sensors such as sensors 32 of FIG. 2 for detecting when devices 10A and 10B are adjacent to each other. For example, components 38 may include magnetic sensors, force sensors, proximity sensors, antenna impedance sensors, light-based sensors, capacitive sensors, resistive sensors that measure resistance to determine when a metal object such as an electronic device housing is in contact with a given device, switch-based sensors, and/or other sensors that detect when the edge of one device housing abuts at least a portion of an edge of another device housing. Sensors in components 38 may also be configured to operate through the front and rear faces of the housings for devices 10A and 10B (e.g., to detect when devices 10A and 10B are overlapping in a front-to-front configuration, a back-to-back configuration, or a front-to-back configuration).

In general, devices 10 may have any suitable number of components 38 and these components may run along the edges of each device 10 (e.g., on the interior side of a housing sidewall formed from metal, plastic, and/or glass or other materials), and/or may be located at other locations within the interior of the housing for each device 10). The configurations of FIG. 3 are illustrative.

Sleeves and other support structures for supporting devices 10A and 10B (sometimes referred to herein as covers or cases) may be formed from plastic, metal, fabric, leather or other natural materials, and/or other materials. In some configurations, covers for system 36 may be foldable.

Figure 4:
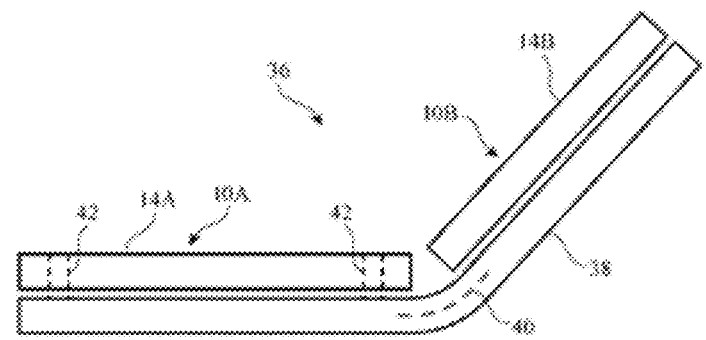
FIG. 4 is a side view of a pair of electronic devices supported by a bendable case with an internal hinge structure in accordance with an embodiment.

FIG. 4 is a cross-sectional side view of system 36 in which devices 10A and 10B are supported by a foldable support structure such as cover 38. Cover 38 of FIG. 4 has hinge structures 40 that help hold cover 38 in a desired bent shape (e.g., to support device 10B at an non-zero angle with respect to device 10A, so that device 10A can serve as a touch sensitive virtual keyboard while device 10B serves as a display for presenting a document or other content to a user, etc.). Hinge structures 40 may be formed from interlocking rotatable structures (e.g., a clutch barrel assembly), may include bendable metal or plastic structures (e.g., bendable strip-shaped members that retain their shape when forced into a particular bent or flat position by a user), or other hinge mechanisms. Hinge structures 40 allow a user to place devices 10A and 10B in a planar configuration (e.g., lying flat on a table so that devices 10A and 10B and their respective displays lie in a common plane) or in a bent configuration of the type shown in FIG. 4 in which the surface normal of the display of device 10A is oriented at a non-zero angle with respect to the surface normal of the display of device 10B and which devices 10A and 10B do not lie in a common plane). Attachment structures 42 (e.g., straps, magnets, adhesive, screws or other fasteners, clamps, etc.) may be used in removably attaching devices 10A and 10B to cover 38.

Figure 5:
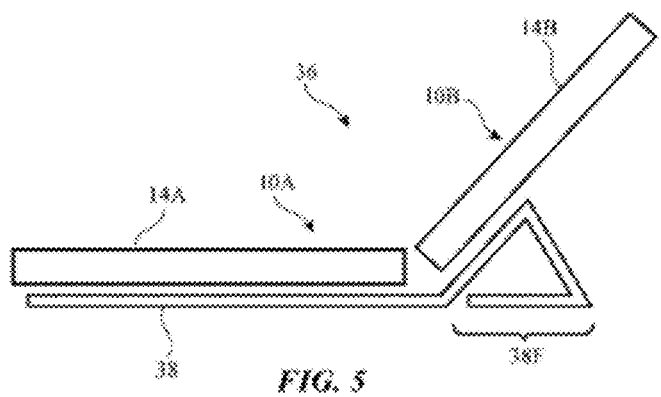
FIG. 5 is a side view of a pair of electronic devices supported by a folded case in accordance with an embodiment.
Figure 6:
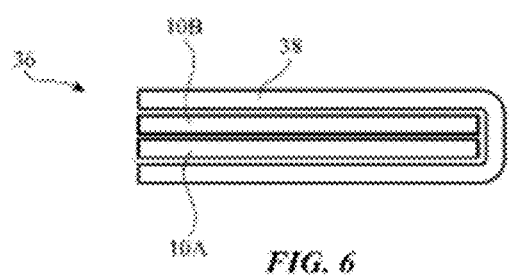
FIG. 6 is a side view of a pair of electronic devices in a case that has been folded back on itself in accordance with an embodiment.

As shown in the example of FIG. 5, cover 38 may have a foldable portion such as portion 38F that can be folded into a shape that supports device 10B at a non-zero angle with respect to device 10A. FIG. 6 shows how cover 38 may be folded 180° to allow the front faces of devices 10A and 10B to face each other. If desired, covers 38 of FIGS. 5 and 6 may be provided with hinge structures such as hinge structures 40. Configurations for cover 38 that support three or more devices 10, that allow devices 10A and 10B to be placed into front-to-back and back-to-back configurations, and/or that allow devices 10A and 10B to be supported in other orientations relative to each other may also be used. In some arrangements, device 10A may be coupled to cover 38 while magnetic components are used in oriented device 10B relative to device 10A or magnetic components and cover 38 may be used together in other configurations. For example, cover 38 may form a base to which device 10A may be attached while magnetic components are used in coupling device 10B to device 10A at a desired angle (e.g., a non-zero angle).

FIGS. 7, 8, 9, and 10 show illustrative configurations in which devices 10A and 10B are oriented relative to each other using magnetic components (see, e.g., components 38 along the peripheral edges of devices 10A and 10B in FIG. 3). When the edges of the housings of devices 10A and 10B are brought together with this type of arrangement, magnetic attraction between magnetic components in respective portions of devices 10A and 10B hold devices 10A and 10B together. Device housings 12A and 12B may have curved sidewalls, flat (vertical) sidewalls, or sidewalls with other suitable cross-sectional profiles.

Figure 7:
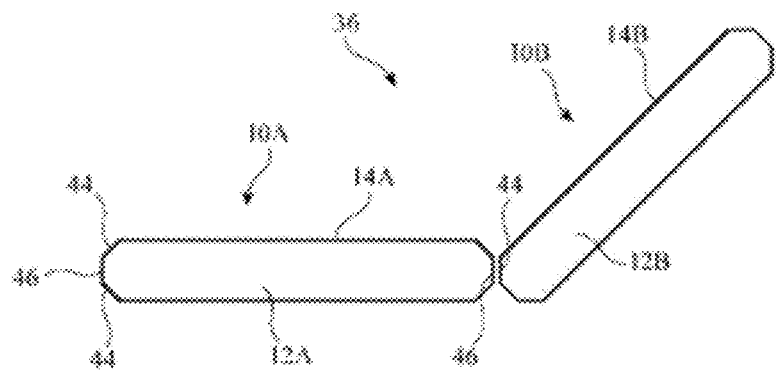
FIG. 7 is a cross-sectional side view of a pair of illustrative electronic devices with beveled housing sidewalls that have been joined at a desired angle with respect to each other using magnetic attraction and the angled surfaces of the sidewalls in accordance with an embodiment.
Figure 8:
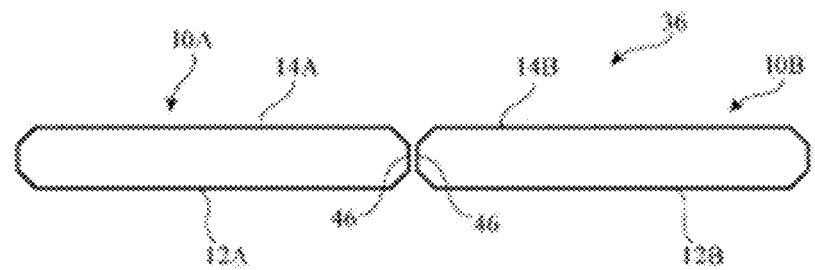
FIG. 8 is a cross-sectional side view of the pair of electronic devices with beveled housing sidewalls of FIG. 7 in a planar configuration in accordance with an embodiment.

In some configurations, the sidewall profile of devices 10A and 10B may help orient devices 10A and 10B relative to each other while the respective abutting edges of devices 10A and 10B are pulled together by magnetic attraction. As shown in FIG. 7, for example, housings 12A and 12B may have beveled sidewalls each of which has two beveled 45° sidewall surfaces 44 and one vertical sidewall surface 46. In the configuration of FIG. 7, one of surfaces 46 bears against to one of surfaces 44 (e.g., magnetic attraction from magnetic components in housings 12A and 12B couple these surfaces together), so that device 10B is oriented at 45° relative to device 10A (e.g., so that device 10A can serve as a touch sensitive virtual keyboard while device 10B serves as a display for presenting a document or other content to a user, etc.). In the illustrative configuration of FIG. 8, one of vertical sidewall surfaces 46 of device 10A abuts one of vertical sidewall surfaces 46 of device 10B, so that devices 10A and 10B are held in a planar orientation relative to each other.

Figure 9:
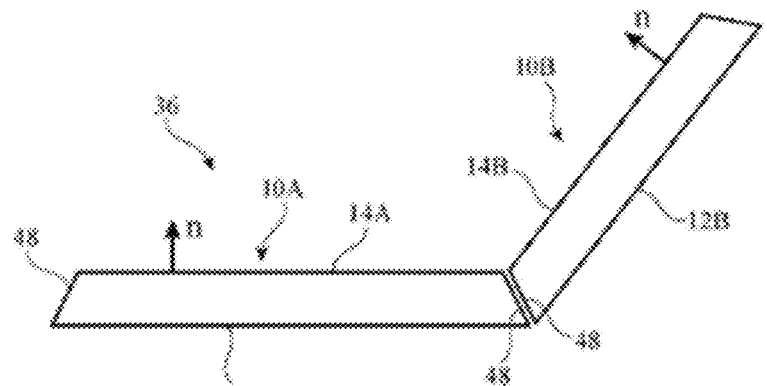
FIG. 9 is a cross-sectional side view of a pair of illustrative electronic devices with angled housing sidewalls that have been joined at a desired angle with respect to each other using magnetic attraction in accordance with an embodiment.
Figure 10:
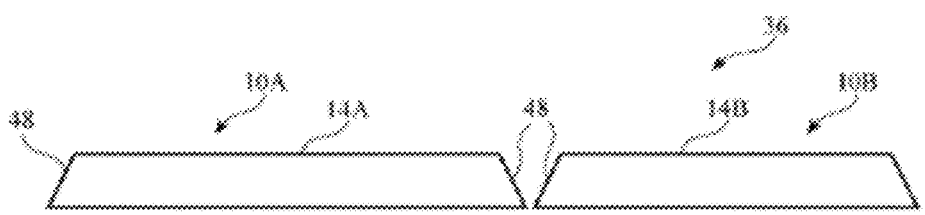
FIG. 10 is a cross-sectional side view of the pair of illustrative electronic devices of FIG. 9 in a planar orientation in accordance with an embodiment.

In the illustrative arrangement of FIGS. 9 and 10, device housings 12A and 12B have angled (outwardly sloped) sidewall surfaces 48 each of which is oriented at a non-zero angle with respect to surface normal n of displays 14A and 14B, respectively. When placed so that sidewall surfaces 48 press against each other and lie in the same plane as shown in FIG. 9, device 10B is supported at a non-zero angle with respect to device 10A. When placed so that sidewall surfaces 48 are not in direct contact, devices 10A and 10B may rest side-by-side in the adjacent device configuration of FIG. 10 (e.g., so that displays 14A and 14B lie in the same plane).

Figure 11:
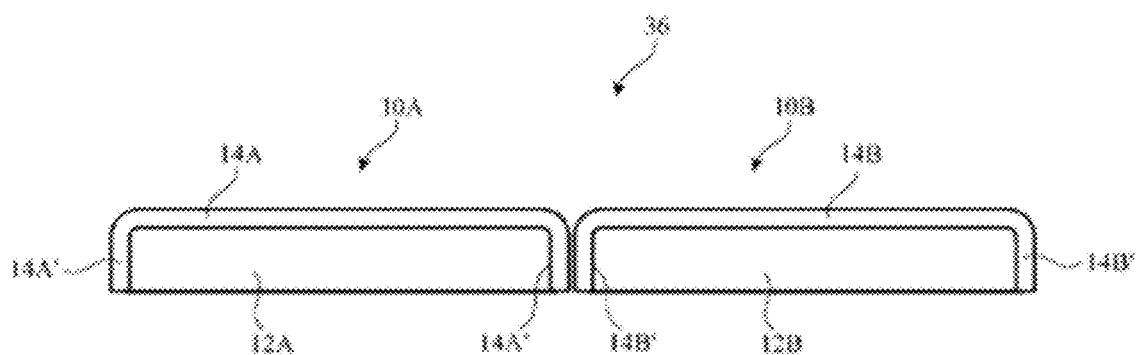
FIG. 11 is a cross-sectional side view of a pair of adjacent electronic devices each of which has a display that covers housing sidewalls in accordance with an embodiment.

Display 14 may cover some or all of the front face of device 10. If desired, display 14 may have portions that extend over some or all of the sidewalls of housing 12. As shown in FIG. 11, for example, display 14 may have left and right edges that fold down over the left and right sidewalls of each device. When placed adjacent to each other as shown in FIG. 11, abutting sidewall portions 14A' and 14B' of displays 14A and 14B, respectively, may be disabled. This allows content (e.g., videos, text, and/or other images) to be displayed in a seamless fashion across the exposed front face surfaces of displays 14A and 14B. The outermost portions 14A' and 14B' of the displays of FIG. 11 (e.g., portion 14A' on the left of device 10A and portion 14B' on the right of device 10B) may be used to display extended portions of the image displayed on the front faces of devices 10A and 10B, may be used to display virtual buttons for system 36, and/or may be temporarily deactivated.

Figure 12:
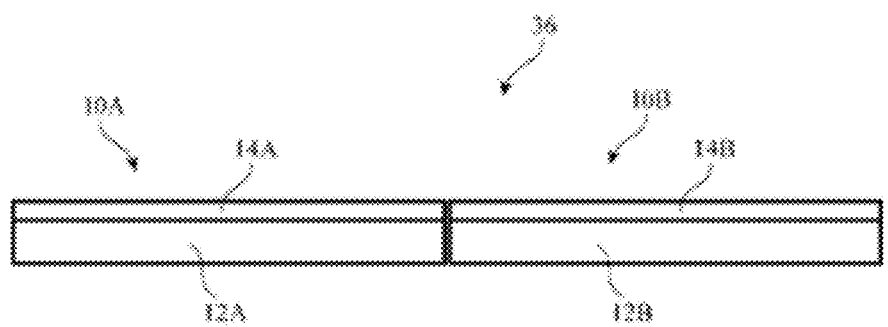
FIG. 12 is a cross-sectional side view of a pair of adjacent electronic devices each of which has a display that is borderless along at least its left and right edges in accordance with an embodiment.

In the arrangement of FIG. 12, displays 14A and 14B have borderless configurations, so that images can be displayed seamlessly across displays 14A and 14B when devices 10A and 10B are adjacent (e.g., when the sidewalls of device housings 12A and 12B abut). Other configurations for devices 10A and 10B may be used, if desired (e.g., configurations in which one or more edges of display 14 has an inactive border).

Figure 13:
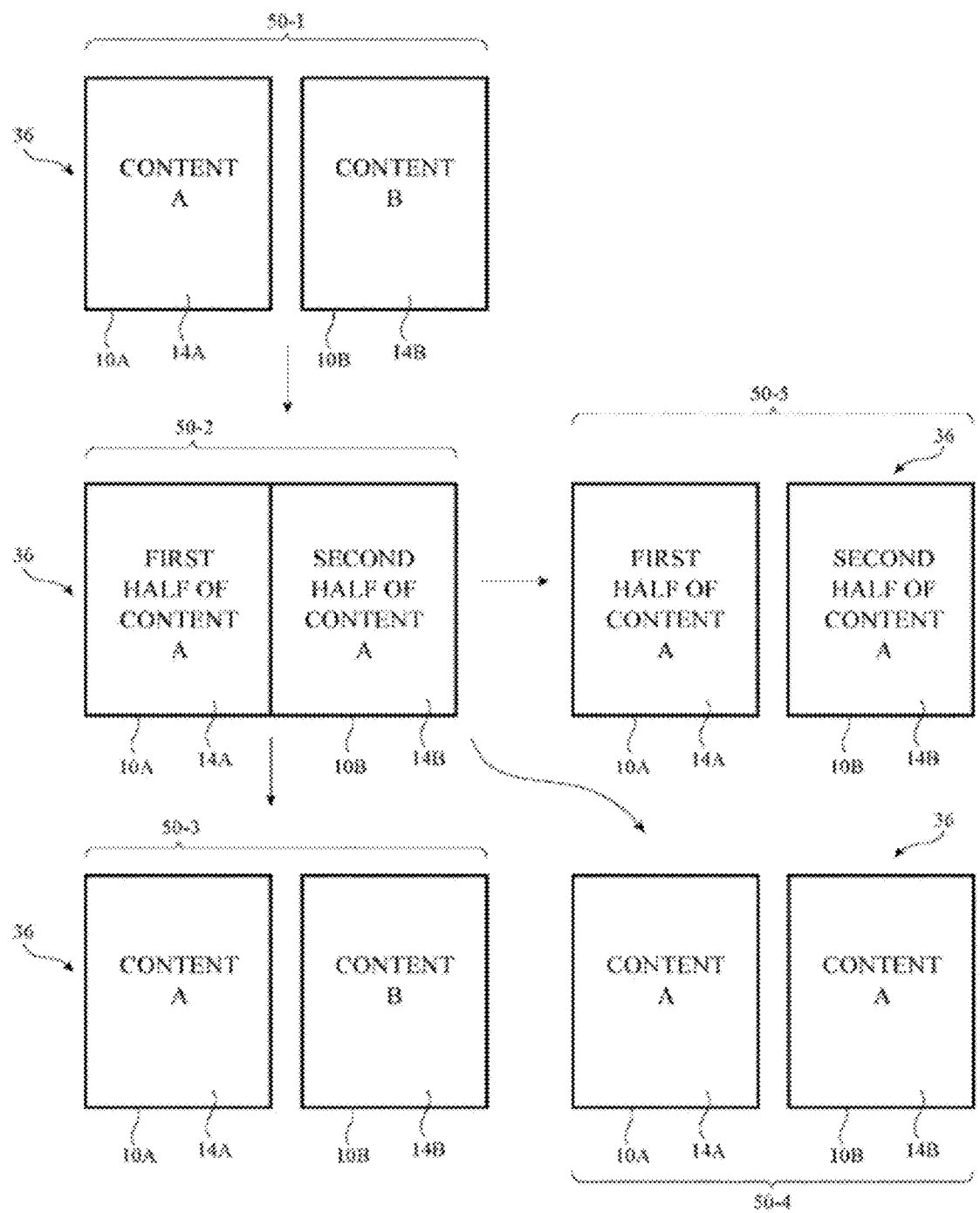
FIG. 13 is a diagram showing how a system with multiple electronic devices may present content to a user in various contexts in accordance with an embodiment.

FIG. 13 illustrates how devices 10A and 10B may behave when brought together and pulled apart.

Initially, devices 10A and 10B of system 36 may be in an independent operating mode represented by state 50-1. In state 50-1, devices 10A and 10B are separated by an air gap and are not adjacent to each other. Sensors in components 38 can apply measured sensor signals to predetermined adjacency thresholds (adjacency criteria such as a minimum separation distance, sidewall alignment criteria, angular orientation criteria, etc.) to determine whether devices 10A and 10B are adjacent or are separated. When separated as shown in state 50-1, each device can operate independently. A single user may operate both devices or each device may be operated by a respective user.

Components 38 may monitor whether devices 10A and 10B are adjacent. Wireless communications (e.g., handshaking) between devices 10A and 10B to determine whether devices 10A and 10B are adjacent and/or other techniques for determining adjacency may also be used. In response to detecting that devices are adjacent, system 36 may transition to a joint (adjacent) operating mode, as illustrated by state 50-2 of FIG. 13.

In state 50-2, some or all of the functions of devices 10A and 10B may continue to operate independently. For example, devices 10A and 10B may display separate content on their respective displays (e.g. a first web page on device 10A and a second web page on device 10B) and/or may play separate audio. At the same time, the joint operating mode may allow at least some of the functions of devices 10A and 10B to be shared. As an example, a wireless communications circuit in device 10A may transmit and receive data for both device 10A and device 10B (and this data may be exchanged locally between devices 10A and 10B using a wired or wireless link between devices 10A and 10B) or measurements from an ambient light sensor in device 10A may be used in controlling screen brightness in the displays of both devices 10A and 10B.

If desired, devices 10A and 10B may operate in a coordinated fashion during the joint mode of state 50-2 so that most or all functions of the devices are coordinated. For example, images that are displayed may be expanded to stretch across displays 14A and 14B to provide a user with an expanded display area, stereo audio may be played from a first speaker in device 10A and a second speaker in device 10B, touch input may be gathered from displays 14A and 14B so that a user can drag on-screen items from display 14A to display 14B or can make touch gestures that extend across displays 14A and 14B, wireless communications capabilities of devices 10A and 10B may be combined to provide enhanced bandwidth and/or additional bands of coverage, etc.

In some arrangements, devices 10A and 10B may be operated in a master-slave (mother/child) configuration. In this type of arrangement, the operation of one device is used in controlling the operation of another device. As an example, device 10A may display a virtual keyboard for system 36 and device 10B may display documents or other content that is being controlled by input supplied to the keyboard. Device 10A may also serve as video controller device, a color picker input area, brush selection area, or other input area for an image editing application that is displaying an edited image on device 10A, may serve as a game controller pad or video playback controller pad with stop, pause, forward, and reverse button for device 10B, or may otherwise serve as a touch controller for device 10B.

Operations in each of these modes need not be mutually exclusive. For example, devices 10A and 10B may initially be operated independently in all respects (state 50-1). In joint mode (state 50-2), a first device function (e.g., use of wireless communications circuitry 26 to receive email messages) may remain separate on each device, a second device function (e.g., audio playback) may be shared (e.g., by presenting the audio in a synchronized stereo arrangement in which a speaker in device 10A provide left channel audio for an audio track while a speaker in device 10B simultaneously provides right channel audio for the same track), and a third device function (e.g., use of displays 14A and 14B) may be implemented using a master-slave arrangement (e.g., device 10A may use display 14A as a touch keyboard and device 10B may use display 14B as a display to present an edited image or other content to a user).

With the illustrative configuration of FIG. 13, devices 10A and 10B initially present separate content (respectively, content A and content B) to their respective users (or to a single user of both devices). When placed adjacent to each other so that system 36 operates in joint state 50-2, content A is presented using both displays 14A and 14B, whereas content B is no longer presented. Content A may be, for example, a video whereas content B may be a desktop screen containing an array of selectable icons. A user may be playing the video on device 10A when device 10B is brought into contact with device 10A. When this configuration is detected, devices 10A and 10B can operate together to display a first half of content A on device 10A and a second half of content A on device 10B. In this way, the user may benefit from an enlarged display area and expanded stereo sound (by using respective speakers in devices 10A and 10B to present stereo to the user).

During joint operating mode (state 50-2), devices 10A and/or 10B may use components 38 (e.g., sensors 32) and optional handshaking procedures (e.g., messages relayed between devices 10A and 10B wirelessly upon detection of adjacency using sensors 32) to determine whether devices 10A and 10B are adjacent. In response to detecting that devices 10A and 10B are no longer adjacent, devices 10A and 10B may transition to an updated operating mode such as a mode corresponding to one of operating states 50-3, 50-4, and 50-5 of FIG. 13. The behavior of devices 10A and 10B after devices 10A and 10B are separated (e.g., whether system 36 transitions to state 50-3, 50-4, or 50-5) can depend on the configuration of devices 10A and 10B during operating state 36 and/or other criteria.

Consider, as an example, a first scenario in which devices 10A and 10B are displaying a video that stretches across displays 14A and 14B in state 50-2. The video (content A in this example) originated from device 10A (via streaming or a video stored in storage in the control circuitry of device 10A). When devices 10A and 10B are separated, system 36 transitions to the operating mode of state 50-3. In state 50-3, device 10A continues to display the same video with its audio track, so that the user's viewing of the video is not disrupted. Device 10B reverts to its original operating mode and displays content B (which may be, for example, a list of selectable icons on a desktop, an email inbox, or other functionality that is potentially specific to device 10B).

In a second illustrative scenario, devices 10A and 10B transition from state 50-2 to state 50-4 when separated. In state 50-2, content for a video is spread across displays 14A and 14B. In this example, the content is being watched by two users who decided to share their screens during the joint operating mode of state 50-2. When the two users need to separate their devices 10A and 10B (e.g., for more convenient viewing angles, because the users are departing for different destinations, etc.), both users desire to continue viewing the video. Accordingly, in this second operating scenario, the video (content A) is displayed separately (in its entirety) on each of displays 14A and 14B. If the video was initially stored locally on only one of the devices, the video can be transferred to the other device during state 50-2 (e.g., using a local communications link between devices 10A and 10B) or that other device can retain access to the video by automatically switching to an on-line video streaming delivery mode when the devices are separated. In scenarios in which the shared content on system 36 of state 50-2 is a website, the website can be displayed separately on both display 14A and 14B in state 50-4.

In a third illustrative scenario, devices 10A and 10B transition from state 50-2 to state 50-5 when separated. The content displayed on displays 14A and 14B of system 36 in state 50-2 may correspond to a game with two users. In the combined display arrangement of state 50-2, a first user's portion of the game (e.g., the first user's game controller and/or a first portion of a game playing space) is displayed on display 14A, whereas a second user's portion of the game (e.g., the second user's game controller and/or a second portion of the game playing space) is displayed on display 14B. Upon transitioning to state 50-5, the first user's game controller and/or the first portion of a game playing space may continue to be displayed on display 14A, whereas the second user's game controller and/or the second portion of the game playing space is displayed on display 14B. This allows the two users to continue to play a shared game (perhaps in a mode in which it is desirable for each user's input to their game controller to not be revealed to the opposing user). At a later stage of game play, the users may recombine their devices to revert to state 50-2. Local wireless communications links or communications links that pass through the internet may be used to allow the first and second user's to play the shared game in state 50-5.

Figure 14:
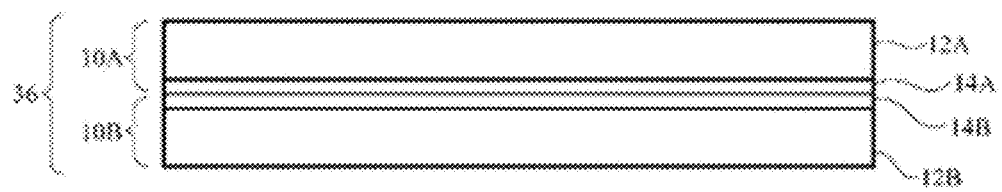
FIG. 14 is a cross-sectional side view of a system in which two devices are in a face-to-face configuration in accordance with an embodiment.
Figure 15:
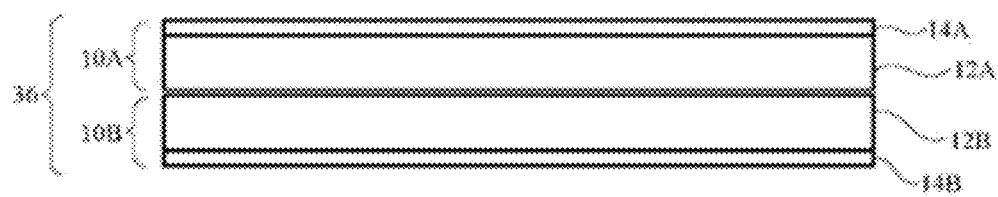
FIG. 15 is a cross-sectional side view of a system in which two devices are in a back-to-back configuration in accordance with an embodiment.
Figure 16:
FIG. 16 is a cross-sectional side view of a system in which two devices are in a back-to-front configuration in accordance with an embodiment.

In some joint operating modes, devices 10A and 10B may be oriented so that they overlap each other in a front-to-front configuration in which their displays overlap and face each other (see, e.g., the arrangement of FIG. 14), in a back-to-back configuration in which their displays overlap and face away from each other so that their rear faces are facing each other (see, e.g., the arrangement of FIG. 15), or in a front-to-back configuration in which their displays are facing in the same direction (see, e.g., FIG. 16). The orientation of devices 10A and 10B in these scenarios can be detected by components 38 and operation of devices 10A and 10B adjusted accordingly. When, for example, devices 10A and 10B are in a front-to-front configuration, displays 14A and 14B may be powered down to conserve power. When devices 10A and 10B are in a back-to-back configuration, one or both of displays 14A and 14B may be active. For example, a display facing up may be on and a display facing down may be turned off. The orientation of devices 10A and 10B relative to the Earth may be detected using an accelerometer in device 10A and/or device 10B. In a back-to-front configuration, it may be desirable to turn on the exposed display while turning of the covered (downward facing) display. In each of these joint operation modes, devices resources such as audio resources, communications circuitry, sensors, and other input-output circuitry 24 can be shared, if desired. Magnetic components (see, e.g., components 38) may be used in coupling devices 10A and 10B together in overlapping configurations.

Figure 17:
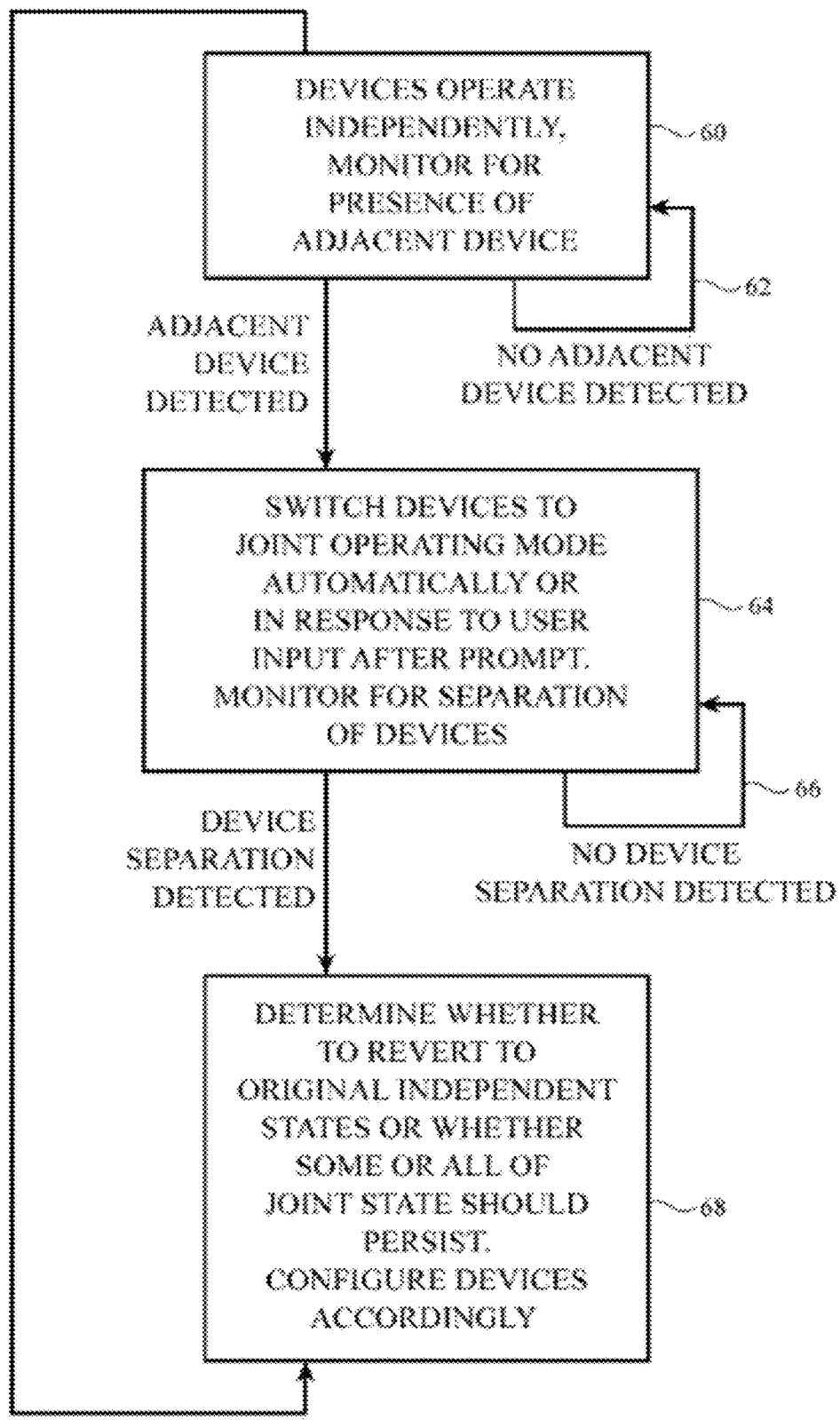
FIG. 17 is a flow chart of illustrative operations involved in using multiple electronic devices in accordance with an embodiment.

Illustrative operations involved in using multiple devices 10 (e.g., devices 10A and 10B) are shown in FIG. 17. During the operations of block 60, devices 10A and devices 10B may be operated in an independent operating mode (see, e.g., state 50-1 of FIG. 13). During this mode, device 10A and/or device 10B may use components 38 (e.g., sensors 32) to monitor for adjacency between devices 10A and 10B. If desired, output from components 38 in device 10A and/or device 10B may be used to initially detect that a sidewall along an edge of device 10B is adjacent to one of the sidewalls along an edge of device 10A and this initial detection may be confirmed using wireless communications between devices 10A and 10B (sometimes referred to as handshaking, authentication, or acknowledgement). For example, if device 10A detects the presence of a possible adjacent device, device 10A can issue a near-field communications request or other wireless request asking adjacent devices to identify themselves. In response, device 10B can use its sensor(s) 32 to confirm adjacency and can wirelessly provide device 10A with this information and/or information on the identity of device 10B and/or other information confirming that device 10B is authorized and desires to jointly operate with device 10A. Configurations in which devices 10A and/or 10B generate confirmatory patterns of magnetic fields (e.g., a magnetic field produced by device 10B that is detected by a magnetic sensor in device 10A), acoustic signals or vibrations (e.g., a sound or vibration that is generated by device 10B and detected by a microphone or accelerometer in device 10A), light (e.g., light from a light-emitting diode in device 10B that is detected by a light detector in device 10A), and/or other in which devices 10A and 10B otherwise generate unidirectional and/or bidirectional localized confirmatory information may also be used in determining adjacency. Simultaneous accelerometer signatures (e.g., simultaneous bumps that are detected by the accelerometers in each device when the devices first contact each other) may also be used as part of an adjacency detection scheme. In general, adjacency between devices 10A and 10B can be determined by using data from adjacency detection sensors, receipt of wireless communications from an adjacent device, and/or other operations that take place in one of devices 10A and 10B or that take place in both devices 10A and 10B. Configurations in which adjacency status information (e.g., sensor readings indicative of device adjacency) is shared between devices 10A and 10B (e.g., when adjacency is confirmed when device 10A detects the presence of device 10B with a sensor in device 10A and when device 10B detects the presence of device 10A with a sensor in device 10B) may enhance adjacency detection reliability. In response to determining that devices 10A and 10B are not adjacent (from information gathered using one or more of sensors 32 and/or other detection mechanisms), monitoring may continue at block 60, as indicated by line 62.

In response to determining that devices 10A and 10B are adjacent (e.g., in response to detection of adjacency by the control circuitry and sensors of either device 10A or device 10B or both and/or confirmation using other adjacency detection/confirmation mechanisms), devices 10A and 10B may transition to a joint operating mode (block 64). The transition to joint operation may take place automatically or may proceed in response to user confirmation by the user of device 10A and/or the user of device 10B that joint operation is desired and authorized. As an example devices 10A and 10B may display an on-screen interactive prompt asking each user (e.g., if there are two users) to enter a password and to confirm that joint operation is desired. Devices 10A and 10B may then proceed to operate in a joint operating mode, as described in connection with state 50-2 of FIG. 13.

In the joint operating mode, one or more resources in device 10A may be shared with one or more corresponding resources in device 10B. As an example, graphics circuitry in the control circuitry of each device may be shared so that images can be displayed across a combined display formed from each of the adjacent displays. During image presentation operations, the graphics circuitry (e.g., a graphics processing unit) in one device may, as an example, render content for both displays and may transfer this content to respective display driver circuitry in each device for displaying on the display of that device. A local wireless link between devices 10A and 10B can be used to transfer content to be displayed from device 10A to device 10B (as an example) or, in some configurations, devices 10A and 10B may independently gather their portions of the content to be displayed from an on-line source or other remote source. Local rendering operations performed based on shared information (e.g., when each part of the shared content corresponds to a user's game controller and/or game playing space) may also be used. In some embodiments, content to be displayed across both displays may be divided before graphics rendering operations and a graphics processing unit in each device may handle rendering operations for its portion of the split content. Each device may have its own display driver circuitry coupled to a pixel array in its own display. The display driver circuitry of each device may be used in displaying an appropriate portion of the content for that device on its display.

As further examples, first and second microphones in devices 10A and 10B may be used jointly to capture stereo audio input, first and second cameras in devices 10A and 10B respectively may be used to capture stereo (e.g., three dimensional) images, first and second respective cameras may be used to gather user free-space gestures (e.g. using triangulation to gather three-dimensional gesture input), or first and second respective cameras may be used to capture image recognition images of a user's face from first and second respective perspectives. Touch screen functionality may be merged across displays 14A and 14B (e.g., to allow icons and other items to be dragged from one display to another, to allow a user touch gesture to extend across multiple displays, to allow a stylus, finger, or other input device to draw a line that extends across multiple displays, etc.). Wireless circuitry in devices 10A and 10B may be used jointly (e.g., to double downloading and uploading bandwidth by combining data streams from the two devices), wired circuitry in devices 10A and 10B may be used jointly (e.g., to allow multiple accessories to be coupled to system 36—one of which is coupled to a port in device 10A and another of which is coupled to a port in device 10B), and other communications and control functions can be operated jointly.

If desired, sensors such as ambient light sensors and proximity sensors may be used jointly. For example, if an ambient light sensor in device 10A is shadowed by a user's hand, readings from an ambient light sensor in device 10B may be used in adjusting the screen brightness for the combined display formed from displays 14A and 14B. Proximity sensor measurements may be gathered from respective proximity sensors in devices 10A and 10B (e.g., to determine whether a user is placing the user's ear next to an ear speaker in either device 10A or device 10B).

To conserve power, some circuitry may be disabled in one device while the circuitry of the other device is used for both devices 10A and 10B. For example, when devices 10A and 10B are used jointly, global positioning system circuitry in one device may be disabled to conserve power while global positioning system circuitry in the other device is enabled to gather satellite navigation system readings.

Displays 14A and 14B may, if desired, use common brightness and color balance (white point) settings so that content appears uniform across displays 14A and 14B. Devices 10A and 10B can revert to their original settings when separated or can (at least temporarily) retain shared joint operating mode settings.

Components 38 (e.g., sensors 32) in devices 10A and/or 10B can monitor for device adjacency during the joint operations of block 64. For example, one or both devices may make sensor measurements to detect when devices 10A and 10B are pulled apart and/or wireless communications between devices 10A and 10B may be used in determining when devices 10A and 10B are no longer adjacent. So long as devices 10A and 10B are positioned so that devices 10A and 10B are adjacent (e.g., so that the edges of devices 10A and 10B abut one another in a side-by-side or overlapping arrangement) and a wired or wireless communications link is supported between devices 10A and 10B so that the control circuitry of devices 10A and 10B can share information and otherwise operate cooperatively to support joint operation, processing may continue at block 64, as indicated by line 66. In response to detecting that devices 10A and 10B have been separated, system 36 may transition from a joint operating mode (e.g., state 50-2 of FIG. 13) to an appropriate separate (independent) operating mode (see, e.g., states 50-3, 50-4, and 50-5 of FIG. 13). During the operations of block 68, it may be determined which, if any, of the operating settings from the joint state are to persist on each of the separate devices before operation loops back to the independent operations of block 60. As an example, if devices 10A and 10B were jointly displaying a web page during the operations of block 64, the web page may continue to be displayed on each device after device separation (e.g. each device may display a browser window with the same web page). As another example, if devices 10A and 10B were playing stereo music through respective first and second speakers in devices 10A and 10B, device 10A (but not device 10B) may continue to play the music through its speakers upon device separation. In general, all joint operating parameters may be retained when devices 10A and 10B are separated, some joint operating parameters may be retained, or no joint operating parameters may be retained.

The foregoing is merely illustrative and various modifications can be made to the described embodiments. The foregoing embodiments may be implemented individually or in any combination.

Figure 18:
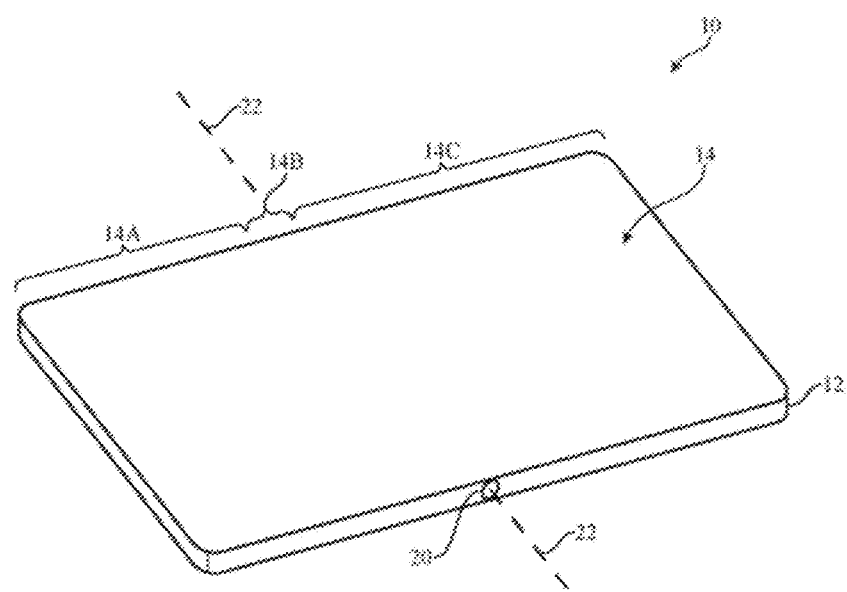
FIG. 18 is a perspective view of an illustrative electronic device having a display in accordance with an embodiment.

An illustrative electronic device of the type that may be provided with a flexible display is shown in FIG. 18. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a wearable or miniature device of other types, a computer display that does not contain an embedded computer, a computer display that includes an embedded computer, a gaming device, a navigation device, an embedded system such as a system in which electronic equipment with a display is mounted in a kiosk or automobile, equipment that implements the functionality of two or more of these devices, or other electronic equipment. In the illustrative configuration of FIG. 18, device 10 is a portable device such as a cellular telephone, media player, tablet computer, watch or other wrist device, or other portable computing device. Other configurations may be used for device 10 if desired. The example of FIG. 18 is merely illustrative.

In the example of FIG. 18, device 10 includes a display such as display 14 mounted in housing 12. Housing 12, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 12 may be formed using a unibody configuration in which some or all of housing 12 is machined or molded as a single structure or may be formed using multiple structures (e.g., an internal frame structure, one or more structures that form exterior housing surfaces, etc.). Housing 12 may have hinge structures such as hinge 20 to allow device 10 to bend about bend axis 22. Housing 12 may have first and second housing portions that rotate with respect to each other as device 10 is bent (folded) about bend axis 22 using hinge 20 or other flexible structures joining the first and second housing portions.

Display 14 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures. A touch sensor may be formed using electrodes or other structures on a display layer that contains a pixel array or on a separate touch panel layer that is attached to the pixel array (e.g., using adhesive). In various embodiments, the on-cell touch sensors can be directly fabricated on top of OLED display panel.

Display 14 may include pixels formed from liquid crystal display (LCD) components, electrophoretic pixels, microelectromechanical (MEMs) shutter pixels, electrowetting pixels, micro-light-emitting diodes (small crystalline semiconductor die), organic light-emitting diodes (e.g., pixels in a thin-film organic light-emitting diode display), or pixels based on other display technologies. Configurations in which display 14 has an array of light-emitting pixels such as an array of organic light-emitting diode pixels may sometimes be described herein as an example.

Display 14 may have a portion that overlaps bend axis 22. To facilitate bending of device 10 about axis 22, all of display 14 may be formed using flexible structures or at least the portion of display 10 that overlaps bend axis 22 may be formed using flexible structures. A display cover layer or other layer may form the outermost surface of the display. Display layers such these (e.g., display cover layers) may be formed from glass, plastic, and/or other transparent display cover layer structures and may be flexible (at least where these layers overlap bend axis 22 of device 10).

As shown in FIG. 18, for example, display 14 may have three portions such as portions 14A, 14B, and 14C. In portions 14A and 14C, display 14 may be flexible or may be rigid (e.g., the pixel array in these areas may be rigid and/or the display cover layer structures in these regions may be rigid). Flexible portion 14B overlaps bend axis 22 and forms a strip that lies between portions 14A and 14C and that extends across the width of the display between opposing edges of the display. To ensure that flexible portion 14B is sufficiently flexible to allow device 10 to bend about axis 22, display layers such as a display cover layer for display 14 may be formed from a thin flexible glass or polymer layer that accommodates bending of display 14 about axis 22 and underlying display layers (e.g., a polymer substrate, metal traces, a polarizer layer, a touch sensor layer, adhesive layers, and other conducting and dielectric layers in an organic light-emitting diode pixel array) may also be formed from flexible materials and structures.

In cold operating environments (e.g., temperatures significantly below room temperature such as temperatures below 10° C., below 0° C., −40° C. to −10° C., or other cold temperatures), materials such as adhesives in flexible portion 14B may become inflexible. To help avoid damage to flexible portion 14B when device 10 is bent open or closed about axis 22, flexible portion 14B may be heated (e.g., while other portions such as portions 14A and 14C of display 14 are not heated or are heated less to conserve energy). Portion 14B may, for example, be heated by using heat spreading structures that help spread heat from integrated circuits and other components in device 10 to portion 14B. With another illustrative arrangement, a heating element under portion 14B may be used to heat portion 14B. Another illustrative arrangement involves self-heating operations. In a self-heating arrangement, pixels in display 14 are illuminated. For example, the light-emitting diodes in at least those pixels in display 14 that are in portion 14B may be turned on to produce light and heat. The heat produced by the illuminated pixels can heat portion 14B (e.g., to room temperature or other suitable temperature that is elevated relative to an initial cold temperature) and help prevent damage to sensitive structures in portion 14B as portion 14B is bent about axis 22. In various embodiments, the heating area may be larger than portion 14B because the adhesive can be a continuous film under 14A and 14C and can stretch and shear during bending/unbending of the display.

Figure 19:
FIG. 19 is a first cross-sectional side view of electronic devices with flexible displays in accordance with an embodiment.
Figure 20:
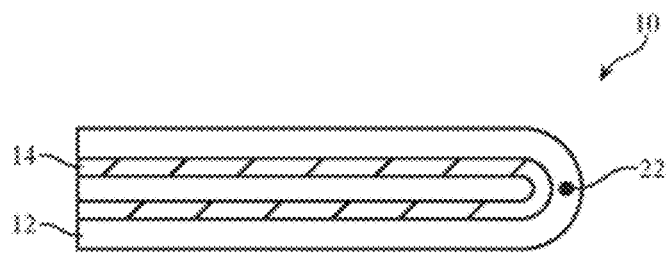
FIG. 20 is a second cross-sectional side view of electronic devices with flexible displays in accordance with an embodiment.

As shown in FIG. 19, device 10 may be folded (bent by 180° or other suitable amount) about bend axis 22 so that display 14 is visible from the outside of device 10 in its folded state. FIG. 20 shows how device 10 may be folded about bend axis 22 so that display 14 is protected within the interior of device 10. Device 10 may have flexible structures (e.g., a hinge) to allow outward bending of the type shown in FIG. 19, to allow inward bending of the type shown in FIG. 20, or to allow bending of both the type shown in FIG. 19 and the type shown in FIG. 20. Configurations in which device 10 is flexed by different amounts (e.g., more than 180° or less than 180°) may also be used.

Figure 21:
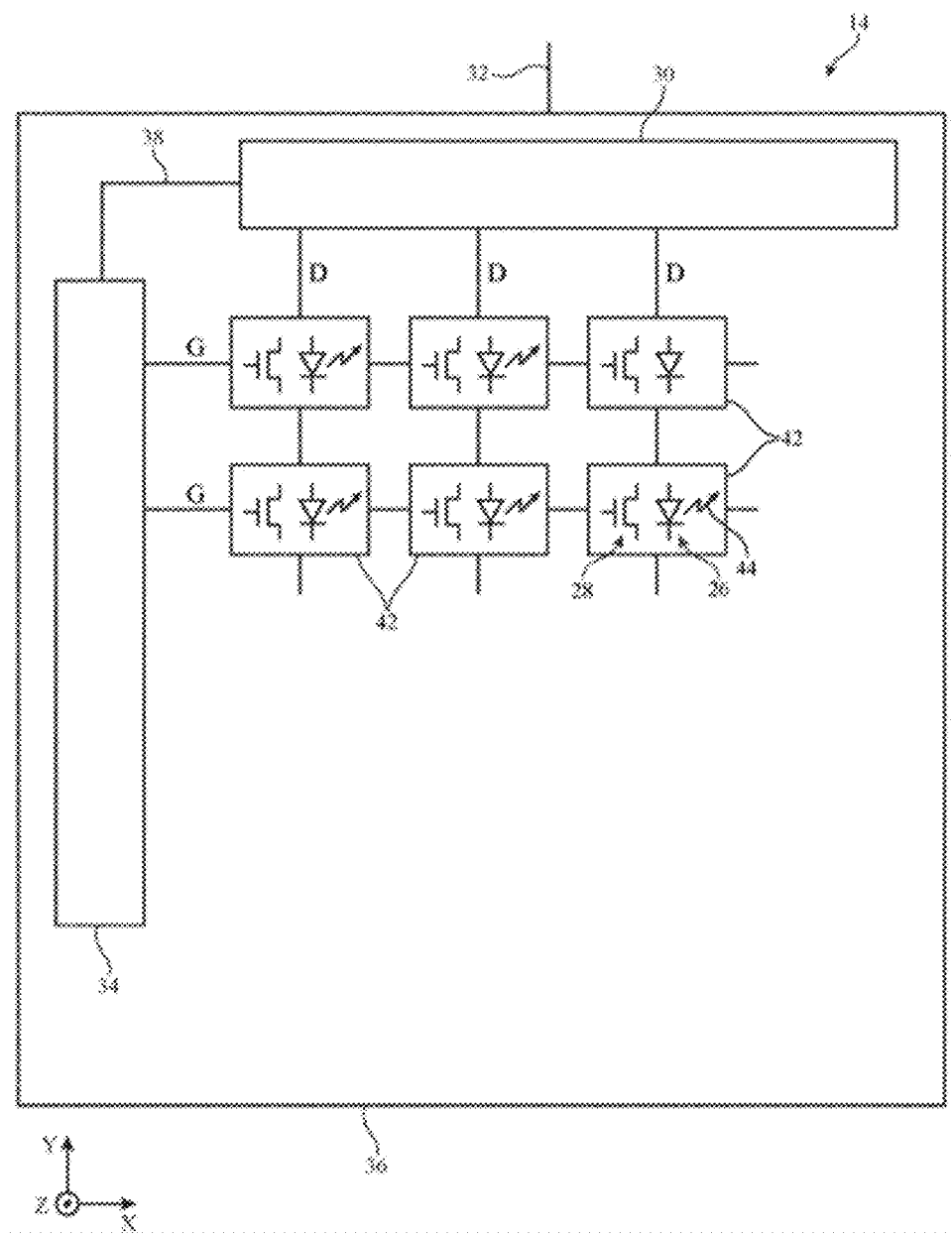
FIG. 21 is a diagram of an illustrative display with an array of light-emitting pixels in accordance with an embodiment.

Display 14 may have a rectangular shape (i.e., display 14 may have a rectangular footprint and a rectangular peripheral edge that runs around the rectangular footprint) or may have other suitable shapes. A top view of circuitry in an illustrative display with a rectangular shape is shown in FIG. 21. As shown in FIG. 21, display 14 may have an array of pixels 42 formed on substrate 36. Substrate 36 may be formed from glass, metal, plastic, ceramic, or other substrate materials. Pixels 42 may receive data signals over signal paths such as data lines D and may receive one or more control signals over control signal paths such as horizontal control lines G (sometimes referred to as gate lines, scan lines, emission control lines, etc.). There may be any suitable number of rows and columns of pixels 42 in display 14 (e.g., tens or more, hundreds or more, or thousands or more). Each pixel 42 may have a light-emitting diode 26 that emits light 44 under the control of a pixel circuit formed from thin-film transistor circuitry such as thin-film transistors 28 and thin-film capacitors). Thin-film transistors 28 may be polysilicon thin-film transistors, semiconducting-oxide thin-film transistors such as indium gallium zinc oxide transistors, or thin-film transistors formed from other semiconductors. Pixels 42 may contain light-emitting diodes of different colors (e.g., red, green, and blue diodes for red, green, and blue pixels, respectively) to provide display 14 with the ability to display color images.

Display driver circuitry may be used to control the operation of pixels 42. The display driver circuitry may be formed from integrated circuits, thin-film transistor circuits, or other suitable circuitry. Display driver circuitry 30 of FIG. 21 may contain communications circuitry for communicating with system control circuitry such as control circuitry 50 of FIG. 2 over path 32. Path 32 may be formed from traces on a flexible printed circuit or other cable. During operation, the control circuitry (e.g., control circuitry 50 of FIG. 2) may supply circuitry 30 with information on images to be displayed on display 14.

To display the images on pixels 42, display driver circuitry 30 may supply image data to data lines D while issuing clock signals and other control signals to supporting display driver circuitry such as gate driver circuitry 34 over path 38. If desired, circuitry 30 may also supply clock signals and other control signals to gate driver circuitry on an opposing edge of display 14 or may use display driver circuitry with other layouts. The configuration of FIG. 21 is illustrative.

Gate driver circuitry 34 (sometimes referred to as horizontal control line control circuitry) may be implemented as part of an integrated circuit and/or may be implemented using thin-film transistor circuitry. Gate lines G (sometimes referred to as horizontal control lines) in display 14 may carry gate line signals (sometimes referred to as scan line signals, emission enable control signals, etc.) for controlling the pixels of each row. There may be any suitable number of control signals per row of pixels 42 (e.g., one or more, two or more, three or more, four or more, etc.).

Figure 22:
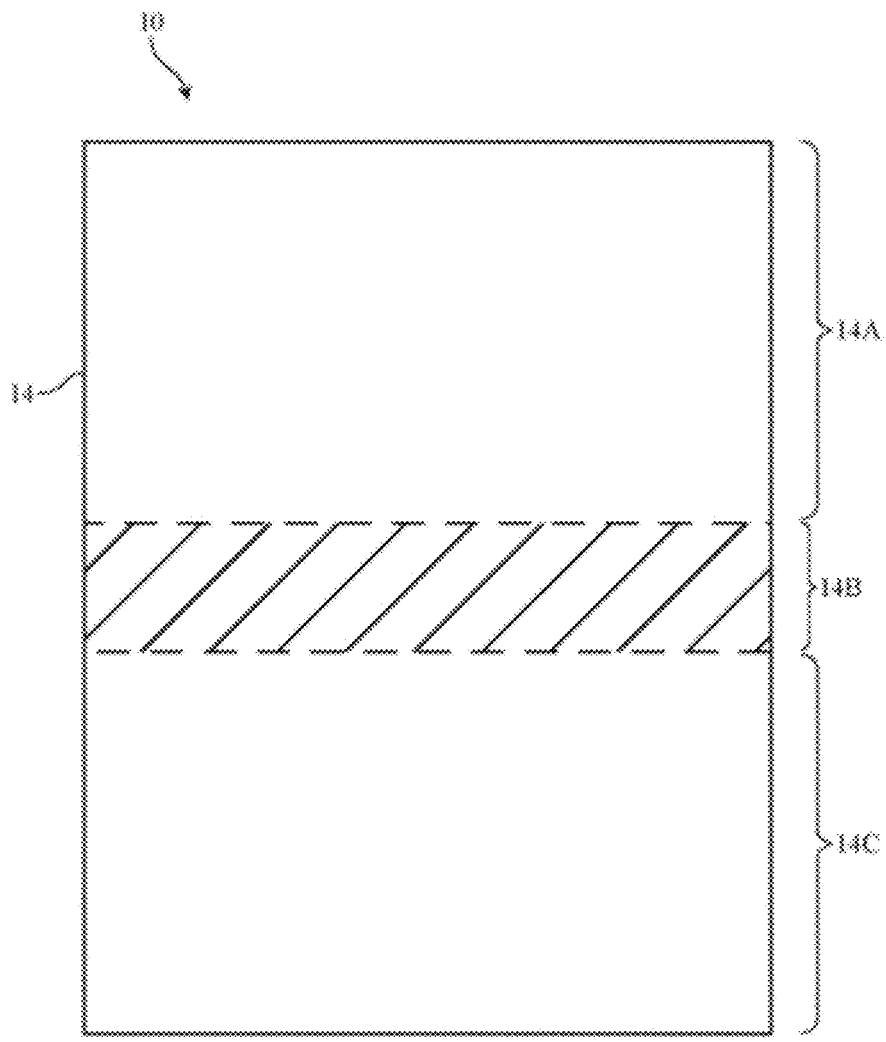
FIG. 22 is a display in which pixels overlapping a bend axis have been illuminate to heat the portion of the display overlapping the bend axis in accordance with an embodiment.

Some or all of pixels 42 in the pixel array of display 14 can be illuminated (fully or partially). Turning pixels 42 on in this way creates a pattern of light on display 14. The pattern of light may include text, icons, a logo or other images, may be a solid or graded block, or may form any other image or abstract pattern (e.g., a solid bright white area, an area of a particular color or pattern of colors, a photograph, etc.). To conserve energy, it may be desirable to only or to primarily illuminate pixels 42 that overlap flexible portion 14B of display 14, as shown in FIG. 22. With this type of arrangement, the pixels in region 14B may be configured to output light 44 at their maximum intensity.

Figure 23:
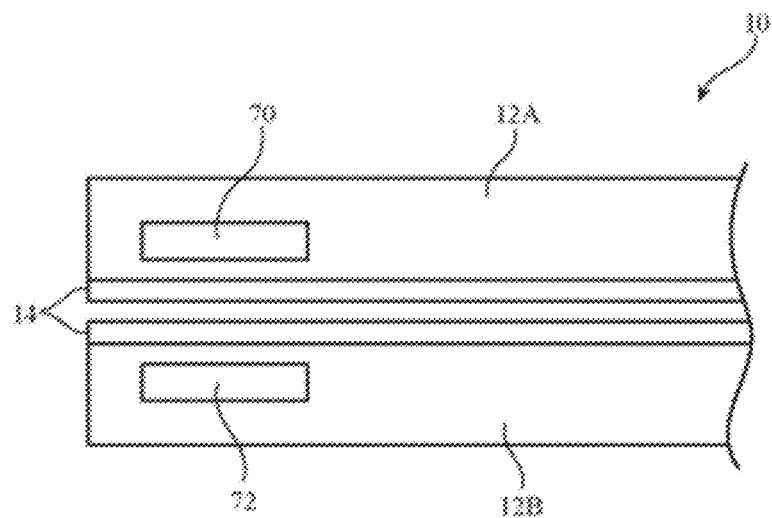
FIG. 23 is a cross-sectional side view of a portion of an electronic device with an electrically adjustable magnetic latching mechanism in accordance with an embodiment.
Figure 24:
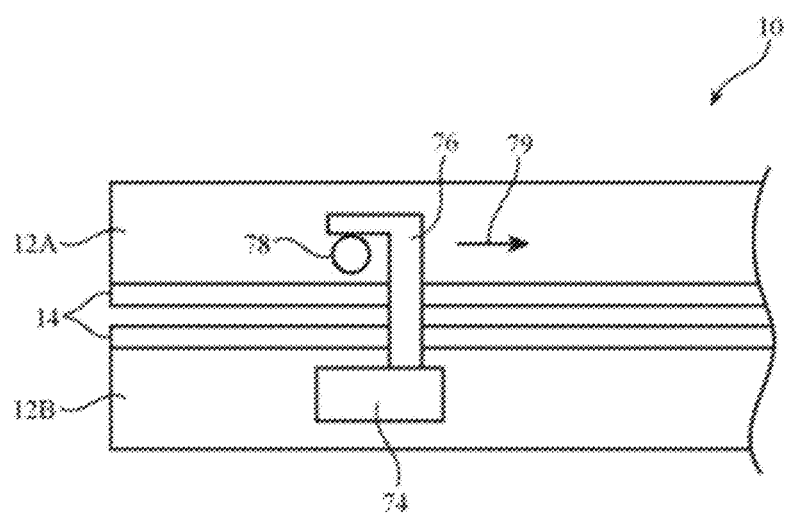
FIG. 24 is a cross-sectional side view of a portion of an electronic device with an illustrative electrically adjustable mechanical latching mechanism in accordance with an embodiment.

FIGS. 23 and 24 show how device 10 may have a latching mechanism that is used to hold housing 12 and device 10 in a closed (folded) configuration when portion 14B of display 14 is cold. In the example of FIG. 23, housing 12 has been bent about bend axis 22, so that end portion (housing structures) 12A and end portion (housing structures) 12B of housing 12 face each other. In this example, display 14 has been folded inwardly. Outwardly folding display arrangements may also be used, if desired.

When housing 12 is folded so that portions 12A and 12B are adjacent to each other, the latching mechanism can be engaged (e.g., to prevent damage to display 14 while portion 14B is cold). When it is desired to release portions 12A and 12B and thereby allow device 10 to be opened for use, the latching mechanism can be disengaged.

The illustrative latching mechanism of FIG. 23 includes first component 70 in device housing portion 12A and second component 72 in device housing portion 12B. Components 70 and 72 may interact magnetically when it is desired to hold device 10 in a folded (closed) state. In one illustrative configuration, both of components 70 and 72 are electromagnets. In another illustrative configuration, component 72 may be an electromagnet and component 70 may be a magnetic structure (e.g., a permanent magnet or a magnetic structure formed from iron, ferrite, or other magnetic material). When control circuitry 50 activates the electromagnet(s), housing portion 12A and housing portion 12B are held together by magnetic attraction and the user of device 10 will be prevented from unfolding device 10. When it is desired to disengage the magnetic latching mechanism of FIG. 23, control circuitry 50 can turn off the control signals (drive current) applied to the electromagnet(s).

The illustrative latching mechanism of FIG. 24 includes electrically controlled actuator 74 and latch member 76 in housing portion 12B and a corresponding latch member such as pin 78 in housing portion 12B. When latch member 76 is placed in the position shown in FIG. 11, latch member 76 will engage pin 78 and thereby hold portions 12A and 12B to each other. When control circuitry 50 uses actuator 74 to move latch member 76 in direction 79, latch member 76 will disengage from pin 78, thereby releasing portions 12A and 12B so that device 10 can be unfolded by moving these portions away from each other.

Figure 25:
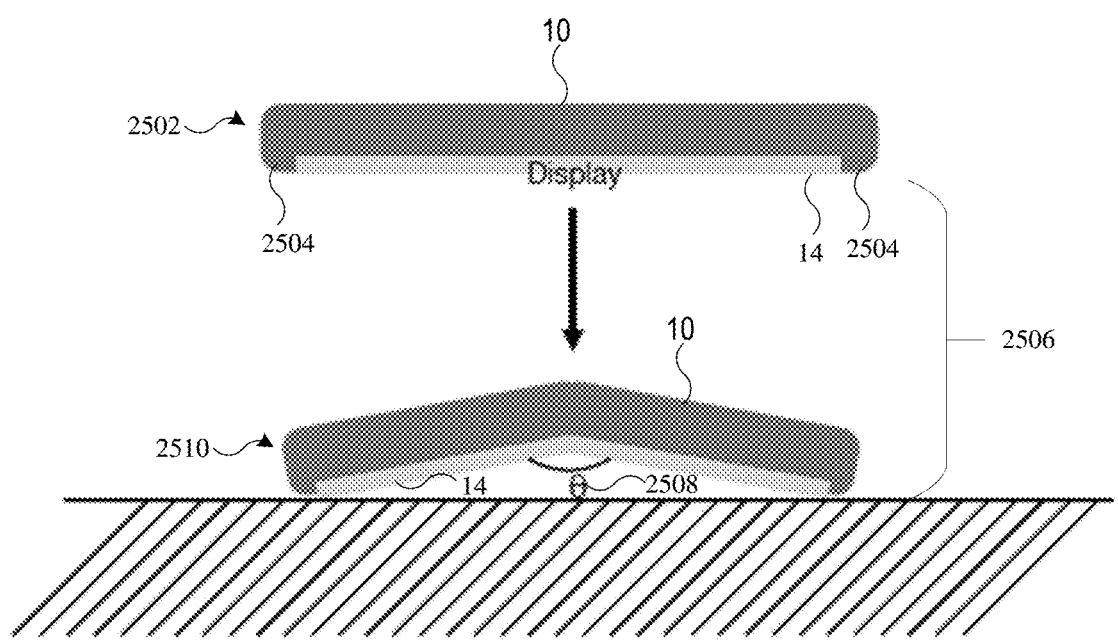
FIG. 25 is an exemplary embodiment of a device with a foldable display incorporating display protective features.

FIG. 25 illustrates an exemplary depiction of the protective features of the exemplary foldable device. In a first position 1502, the foldable device 10 is dropped from a height 2506 above the ground. In the first position 1502 the display is unfolded or flat. The device 10 can include edges 2504 around the display 14. The edges 2504 can be reinforced to be able to withstand forces.

A sensor in the device 10 senses the acceleration of the device. If the acceleration of the device 10 exceeds a predetermined threshold, protective features are engaged to protect the display 14. For example, if the device 10 is dropped from a height 2506, the sensor in the device 10 can detect the acceleration or motion and after a threshold limit is reached the protective features of the device 10 can be engaged. The protective features can include folding the display 14 about the hinge so the angle between either the two displays or two portions of the same display 14 are at an angle 2508 less than 180 degrees. In this way, in a second position 2510 the device 10 can strike the ground so that the display 14 is protected. The device 10 can strike on the edges 2504 instead of the display 14, in order for the edges 14 to absorb the forces from the drop.

Figure 26A:
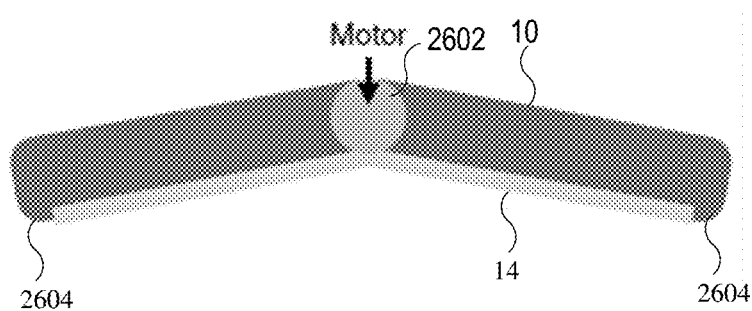
FIG. 26A is an exemplary embodiment of a device with a motorized release mechanism.

FIG. 26A illustrates a first exemplary depiction of the protective features of the exemplary foldable device. FIG. 26A illustrates a device 10 with a foldable display 14. The display can include a motorized hinge 2602 as a release mechanism. The motorized hinge 2602 can include a reverse rotation (e.g., closing) of a motor when a fall is detected. In various embodiments the motorized hinge 2602 can close the display to an angle less than 180 degrees. In various embodiments, the motorized hinge 2602 can close the display 14 completely, depending on the speed of the motor and the height the device 10 is dropped from.

Figure 26B:
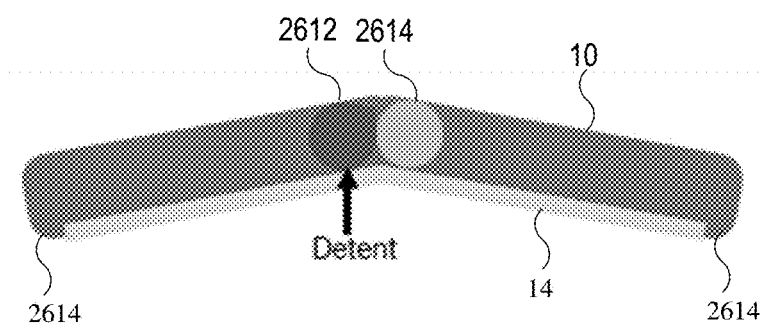
FIG. 26B is an exemplary embodiment of a device with a spring-loaded detent release mechanism.

FIG. 26B illustrates a second exemplary depiction of the protective features of the exemplary foldable device. FIG. 26B illustrates a device 10 with a foldable display 14. The display can include a detent 2612 (e.g., a spring-loaded detent) as a release mechanism. The detent 2612 can work with a mechanical hinge 2614. The detect can be electromechanically released with spring force from the hinge. After the spring-loaded detent is retracted a spring force on the hinge can mechanically cause the device to close, at least partially if the acceleration exceeds a predetermined threshold. The detent can be released when a fall is detected. In various embodiments the detent 2612 can close the display to an angle less than 180 degrees. In various embodiments, the detent 2612 can close the display 14 completely, depending on height the device 10 above the ground.

The device 10 can collects sensor data regarding the motion of the user. For instance, using the motion sensors (e.g., one or more accelerometers), the device 10 can measure an acceleration experienced by the motion sensors, and correspondingly, the acceleration experienced by the device 10. Further, using the motion sensors (e.g., one or more compasses or gyroscopes), the device 10 can measure an orientation of the motion sensors, and correspondingly, an orientation of the device 10. In some cases, the motion sensors can collect data continuously or periodically over a period of time or in response to a trigger event. In some cases, the motion sensors can collect motion data with respect to one or more specific directions relative to the orientation of the device 10. For example, the motion sensors can collect sensor data regarding an acceleration of the device 10 with respect to the x-axis (e.g., a vector projecting from a side edge of the device 10, the y-axis (e.g., a vector projecting from a front edge of the 10, and/or the z-axis (e.g., a vector projecting from a top surface or screen of the mobile device 10, where the x-axis, y-axis, and z-axis refer to a Cartesian coordinate system in a frame of reference fixed to the device 10 (e.g., a "body" frame).

As the user moves, the device 10 can use the motion sensors to continuously or periodically collect sensor data regarding an acceleration experienced by the motion sensors with respect to y-axis over a period of time. The resulting sensor data can be presented in the form of a time-varying acceleration signal. In some cases, the acceleration system can obtain acceleration samples at a sample frequency of 800 Hz using the motion sensors, with a sampling bandwidth of 200 Hz. In practice, other sampling frequencies and/or sampling bandwidths are also possible.

In the example above, the acceleration signal indicates the acceleration experienced by the device 10 with respect to the y-axis of the device. In some cases, the acceleration signal can also indicate the acceleration experienced by the device 10 with respect to multiple different directions. For example, the acceleration signal can include an x-component, a y-component, and a z-component, referring to the acceleration experienced by the device 10 with respect to the x-axis, the y-axis, and the z-axis of the device 10, respectively. Each component also can be referred as a channel of the acceleration signal (e.g., "x-channel," the "y-channel," and the "z-channel").

The device 10 can analyze the acceleration signal to determine whether the device 10 has fallen. For instance, if the device 10 has fallen, the device 10 may experience a relatively strong impact (e.g., when the device 10 strikes the ground). Such an impact can be identified based on a magnitude of the acceleration experienced by the device 10 (e.g., the rate of change in the velocity of the mobile device), a magnitude of the jerk experienced by the mobile device (e.g., the rate of change in the acceleration of the mobile device), and an oscillatory behavior of the acceleration experienced by the device 10. Each of these parameters can be determined using the acceleration signal.

As an example, the magnitude of the acceleration experienced by the device 10 can be determined, for each channel of the acceleration signal, using the relationship:

$$\text{mag}=\max(\text{abs}(a(n))),$$

where mag is the magnitude of acceleration for that channel, a(n) is the nth sample of the acceleration signal for that channel, and max is the maximum calculated over a sliding window of samples of the acceleration signal, nwindow. In some cases, nwindow can correspond to the number of samples spanning an interval of time of 0.2 seconds or approximately 0.2 second. For example, if the sampling frequency for the acceleration signal is 800 Hz, nwindow can be 160. In practice, other values for nwindow are also possible.

Alternatively, the magnitude of the acceleration experienced by the device 10 can be determined, for each channel of the acceleration signal, using the relationship:

$$\text{mag}=\max(a(n))-\min(a(n)),$$

where mag is the magnitude of acceleration for that channel, a(n) is the nth sample of the acceleration signal for that channel, max is the maximum calculated over a sliding window of samples nwindow, and min is the minimum calculated over the window of samples the acceleration signal, nwindow. As above, in some cases, nwindow can correspond to the number of samples spanning an interval of time of 0.2 seconds or approximately 0.2 second, though in practice, other values for nwindow are also possible.

If the acceleration signal includes acceleration measurements with respect to a single direction (e.g., having a single channel, such as a y-channel), the magnitude of the acceleration with respect to that direction can be determined using the relationship above. The resulting value is representative of the magnitude of the acceleration for the acceleration signal. Alternatively, the total energy from all three channels over the window of interest (e.g. nwindow) may be used as the total magnitude of acceleration. For example, one notion of total energy could be computed as:

$$\text{mag}=\sqrt{\max(|x|)^2+\max(|y|)^2+\max(|z|)^2}$$

If the acceleration signal includes acceleration measurements with respect to multiple directions (e.g., having multiple channels, such as a x-channel, a y-channel, and a z-channel), the magnitude of the acceleration with respect to each direction can be individually determined using the relationship above, resulting in three individual magnitude values (corresponding to the three channels, respectively). The greatest magnitude value can be selected as representative of the magnitude of the acceleration for the acceleration signal. In various embodiments, the threshold vertical acceleration (e.g., z-channel) can be the acceleration forces due to gravity (e.g., 9.8 meters per second per second). In various embodiments, the features will only be triggered in free-fall acceleration or vertical acceleration (i.e., if the device is thrown) to avoid triggering the features when users are riding in a car, a train, or an airplane etc. In various embodiments, the features can be selectively enabled and disabled (e.g., riding a roller coaster while taking a selfie.)

Figure 27:
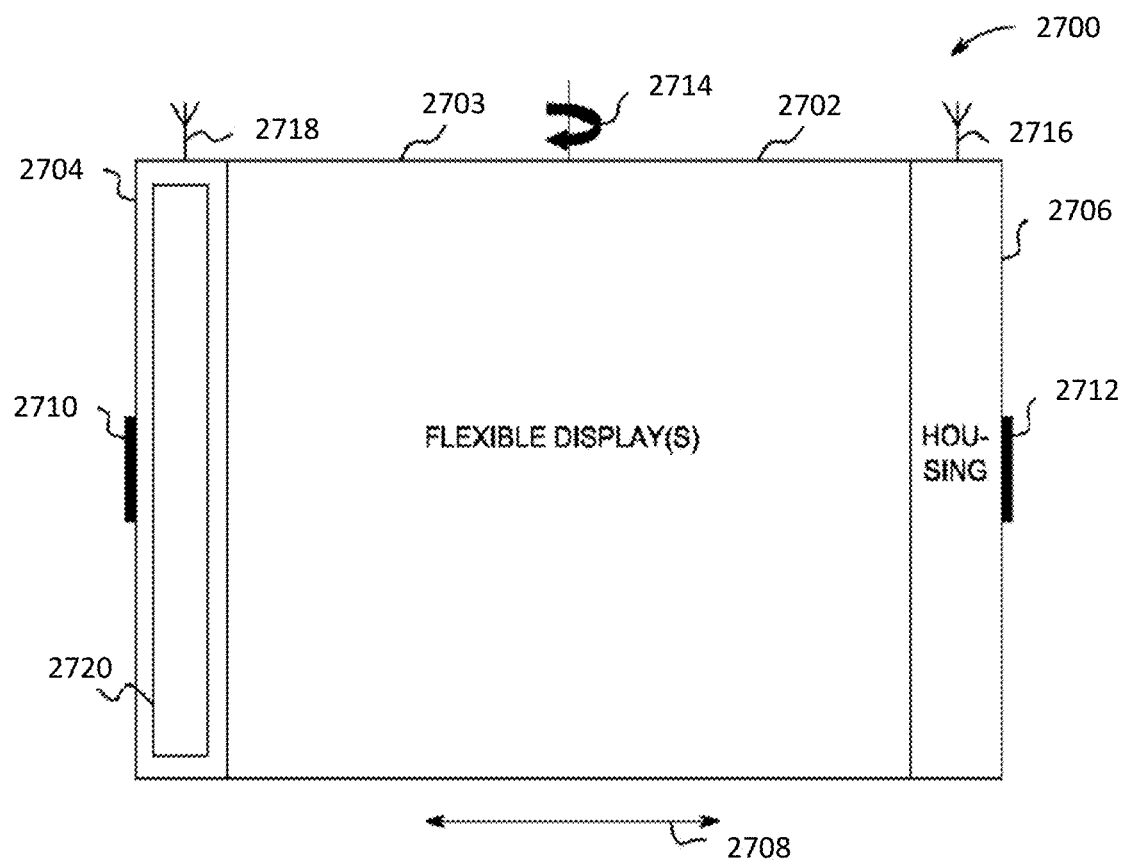
FIG. 27 is a diagram of a device having one or more electronic flexible screens.

FIG. 27 is a diagram of a device 200 having one or more electronic flexible screen or display devices 2702. The one or more electronic flexible screen or display devices 2702 may be configured, manufactured, produced, or assembled based on the descriptions provided in U.S. Patent Publication Nos. 2007-247422, 2007-139391, 2007-085838, or 2006-096392 or U.S. Pat. No. 7,050,835 or WO Publication No. 2007-012899 all herein incorporated by reference as if fully set forth. The one or more electronic flexible screen or display devices 2702 may be configured and assembled using organic light emitting diodes (OLED), liquid crystal displays using flexible substrate technology, flexible transistors, field emission displays (FED) using flexible substrate technology, as desired. In the case for multiple electronic flexible screens or display devices 2702, rotation 2714 reveals a second electronic flexible screen or display device 2703 on the back of device 2700.

Any one of housing members 2704 and 2706 selectively house certain hardware components described in device 2700 such as one or more processors, memory, one or more sensors, and one or more network adapters. In one embodiment of the invention, housing members 2704 and 2706 may each have individual transmitting/receiving antennas 2716 and 2718 for providing spatial and time diversity. One or more electronic flexible screen or display devices 2702 can optionally be configured to collapse 2708 and roll up into housing members 2704 or 2706 for portability. For orientating device 2700 in a circular manner for a presentation or posting on a light post as an advertisement, attachment members 2710 and 2712 may be used. Housing members 2704 and 2706 may be rectangular or cylindrical and provide grasping positions, the ability to position device 2700 upright on a flat surface, or the ability to mount device 2700 on a flat surface, as desired. It is appreciated by one skilled in the art that housing members 2704 and 2706 and one or more electronic flexible screen or display devices 2702 are not drawn to scale. They may have different shapes and dimensions while configured to provide the same functionality provided herewith.

Still referring to FIG. 27, in another embodiment device 2700 may optionally have a liquid crystal display (LCD), LED, FED, or OLED display unit 2720. For this case, when one or more electronic flexible screen or display devices 2072 is collapsed into housing member 2706 adjacent display unit 2720 is still available for displaying content. When one or more electronic flexible screen or display devices 2702 is expanded out of housing member 2704 or 2706, the combination of display unit 2720 and flexible screen or display devices 2702 provides a larger screen size for a single graphical feed or for having separate graphical feeds or windows in each display unit, as desired. In this configuration, the images displayed on flexible screen or display devices 2702 can be responsive to one or more sensors detecting a bending of flexible screen or display devices 2702.

Figure 28:
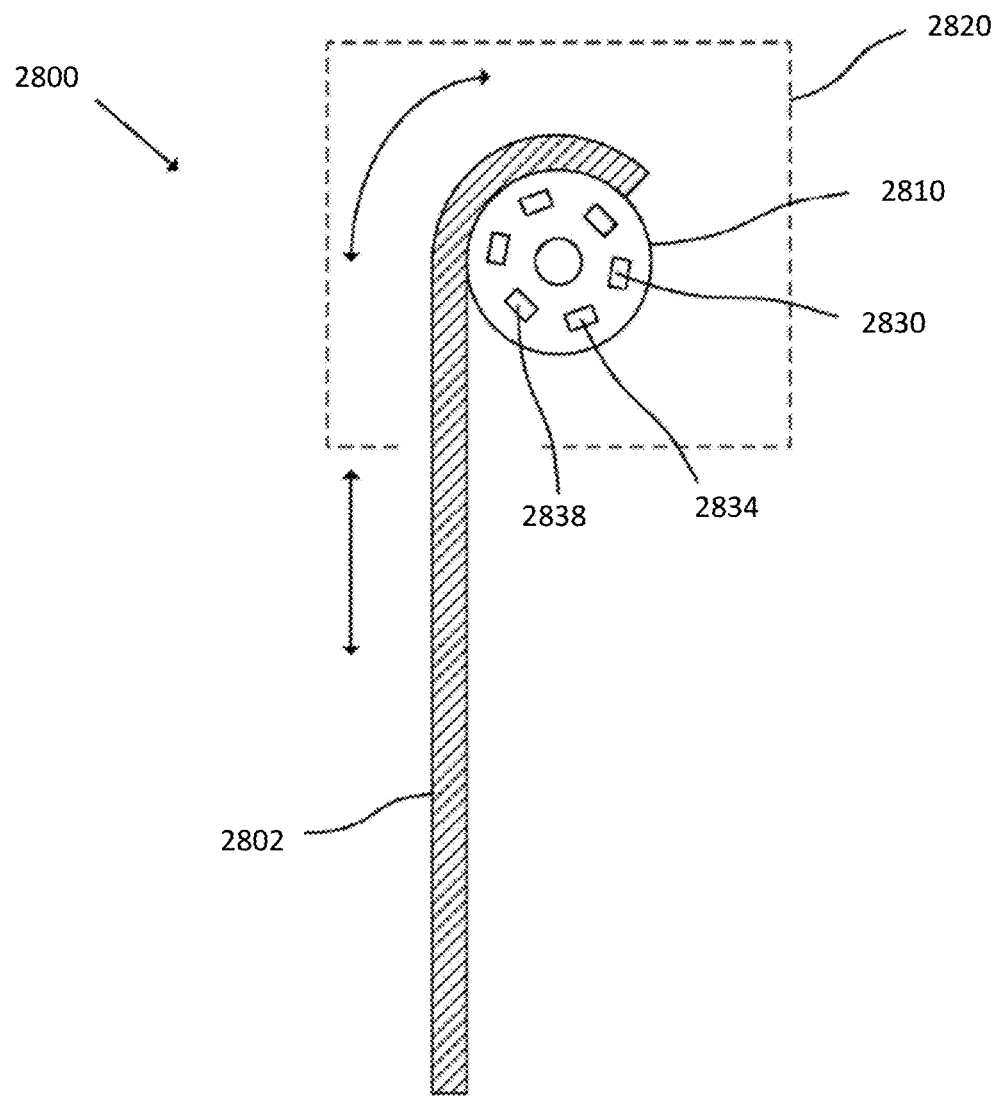
FIG. 28 is schematic cross-sectional side view illustration of a system including a flexible display panel secured to a spool in accordance with an embodiment of the invention.

FIG. 28 is schematic cross-sectional side view illustration of a system 2800 including a flexible display panel 2802 secured to a spool 2810 in accordance with an embodiment of the invention. FIG. 28 is a schematic cross-sectional side view illustration of a flexible display panel 2802 including an array of LEDs and microchips in a display area on a front surface of the display substrate in accordance with an embodiment of the invention. In various embodiments, the display panel 2802 can also include an OLED display. The display panel 2802 may be similar to any of the display panels previously described above. In the embodiment illustrated in FIG. 28, the flexible display panel 2802 is rollable into and out of a housing 2820. In such an embodiment, rather than locating the driver ICs 2830 additional IC chips 2834 and battery 2838 on the back surface of the display substrate, any combination of these components can be located within the housing 2820, such as on the spool 2810. In other embodiments, any of these components may also be located on the back surface of the display substrate. For example, a thin film battery 2838 can be located on the back surface, or a plurality of batteries 2838 can be located on the back surface. Likewise one or more driver ICs 2830 may be located on the back surface to reduce transmission line distance to the microchips.

Figure 29:
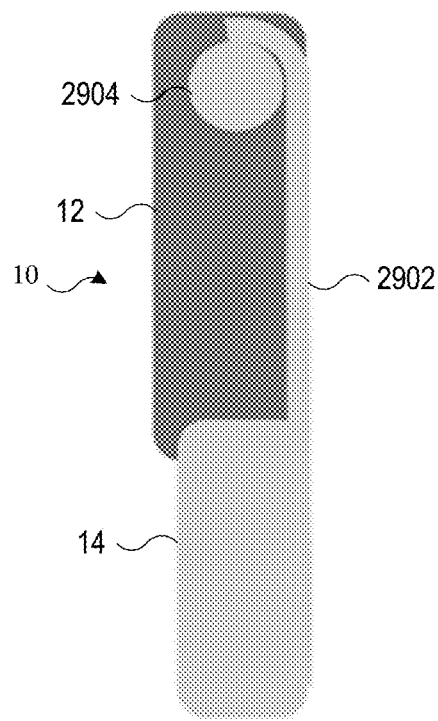
FIG. 29 illustrates an exemplary device with a rollable display in which the display is extended.

FIG. 29 illustrates an exemplary device 10 with a rollable display 14. The display 14 can be attached to an extension member 2902. The extension member 2902 is attached to a display 14 at one end and a spool 2904 at the other end. FIG. 29 illustrates the extension member 2902 in the extended position in which the display 14 extends outside the housing 12 of the device 10. The spool 2904 can include a spring under tension to allow the display to be retracted into the housing 10.

Figure 30:
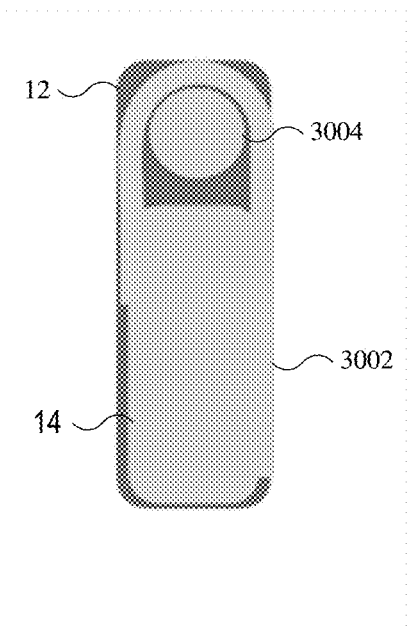
FIG. 30 illustrates an exemplary device with a rollable display in which the display is retracted.

FIG. 30 illustrates an exemplary device 10 with a rollable display 14. Similar to FIG. 29, the display 14 can be attached to an extension member 3002. The extension member 3002 is attached to a display 14 at one end and a spool 3004 at the other end. FIG. 30 illustrates the extension member 3002 in the retracted position in which the display 14 is retracted into the housing 12 of the device 10. The spool 3004 can include a spring under tension to allow the display to be retracted into the housing 10. In various embodiments, sensors (e.g., IMU sensors) in the device can detect the device 10 being dropped. Up detecting a predetermined acceleration, the release mechanism allows the extension member 3002 to retract the display 14 into the housing 12.

Figure 31:
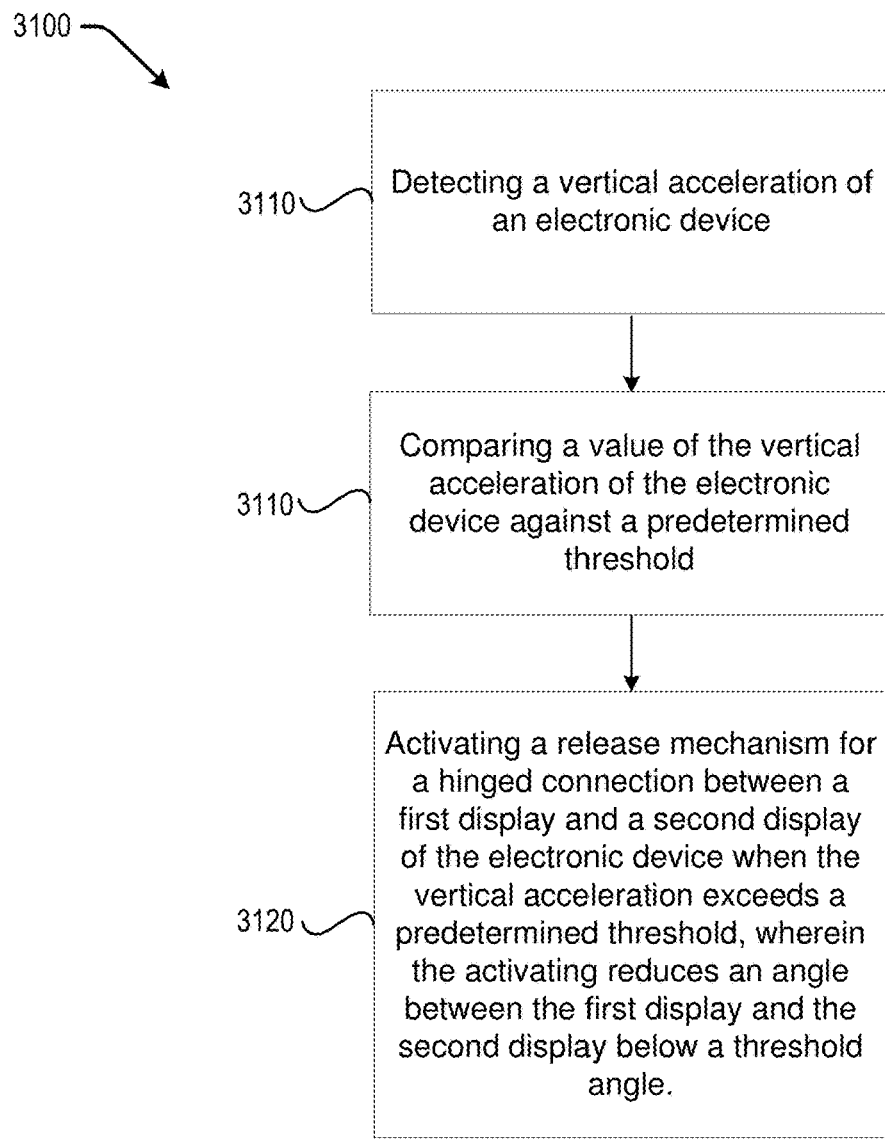
FIG. 31 is a flowchart of an example process associated with techniques to protect a display of an electronic device.

FIG. 31 is a flowchart of an example process 3100 associated with techniques to protect a display of an electronic device. In some implementations, one or more process blocks of FIG. 31 may be performed by an electronic device. Additionally, or alternatively, one or more process blocks of FIG. 31 may be performed by one or more components of device 10, such as control circuitry 50, sensors 56, display 14, and release mechanism 2704. In various embodiments, a first display or the second display is an organic light emitting diode display. In various embodiments, the first display and the second display each comprise regions of a foldable display.

At 3110, the process 3100 can include detecting a vertical acceleration of an electronic device. The vertical acceleration can be detected by an accelerometer. In various embodiments, the vertical acceleration can be detected by an IMU. The vertical acceleration can be converted to a numerical value. The value for the vertical acceleration can be stored in a memory of the device.

At block 3120, the process 3100 can include comparing a value of the vertical acceleration of the electronic device against a predetermined threshold. In various embodiments, a predetermined threshold value of acceleration can be stored in a memory. The processor can compare the detected acceleration value with the predetermined threshold value.

At block 3130, the process 3100 can include activating a release mechanism for a hinged connection between a first display and a second display of the electronic device when the value of the vertical acceleration exceeds the predetermined threshold, wherein the activating reduces an angle between the first display and the second display below a threshold angle. In various embodiments, the threshold angle is an angle less than 180 degrees.

In various embodiments, the release mechanism comprises a motorized hinge. In various embodiments, the release mechanism comprises a mechanical hinge with a spring-loaded detent.

In various embodiments, a mobile device can include one or more memories and one or more processors in communication with the one or more memories and configured to execute instructions stored in the one or more memories to performing operations of a method described above.

In various embodiments, a computer-readable medium may store a plurality of instructions that, when executed by one or more processors of a computing device, cause the one or more processors to perform operations of any of the methods described above.

Although FIG. 31 shows example steps of process 3100, in some implementations, process 3100 can include additional steps, fewer steps, different steps, or differently arranged steps than those depicted in FIG. 31. Additionally, or alternatively, two or more of the steps of process 3100 can be performed in parallel.

Figure 32:
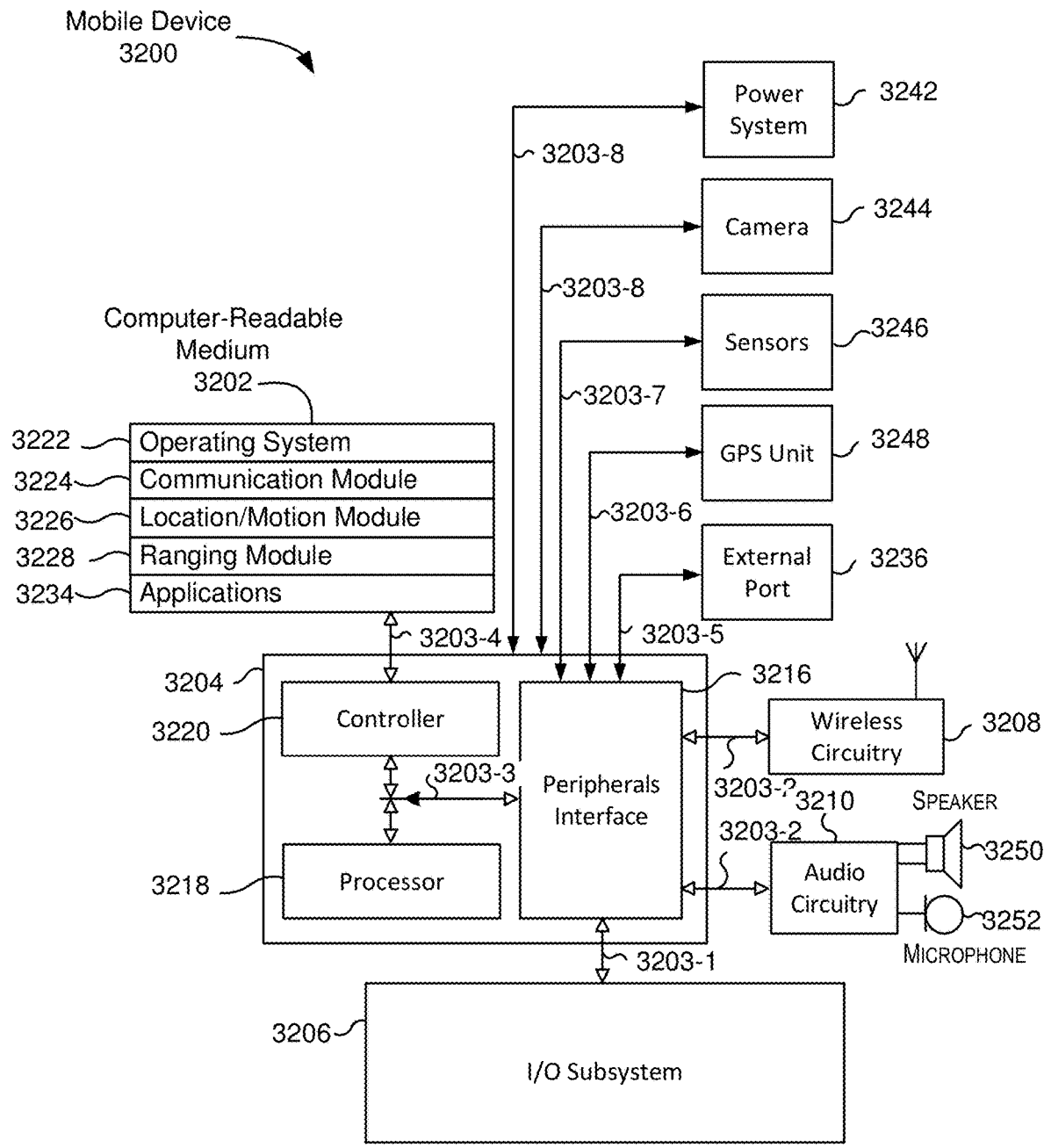
FIG. 32 is a block diagram of an example electronic device.

FIG. 32 is a block diagram of an example electronic device 3200. Device 3200 generally includes computer-readable medium 3202, control circuitry 3204, an Input/Output (I/O) subsystem 3206, wireless circuitry 3208, and audio circuitry 3210 including speaker 3250 and microphone 3252. These components may be coupled by one or more communication buses or signal lines 3203. Device 3200 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

It should be apparent that the architecture shown in FIG. 32 is only one example of an architecture for device 3200, and that device 3200 can have more or fewer components than shown, or a different configuration of components. The various components shown in FIG. 32 can be implemented in hardware, software, or a combination of both hardware and software, including one or more signal processing and/or application specific integrated circuits.

Wireless circuitry 3208 is used to send and receive information over a wireless link or network to one or more other devices' conventional circuitry such as an antenna system, a radio frequency (RF) transceiver, one or more amplifiers, a tuner, one or more oscillators, a digital signal processor, a CODEC chipset, memory, etc. Wireless circuitry 3208 can use various protocols, e.g., as described herein. In various embodiments, wireless circuitry 3208 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), Long-term Evolution (LTE)-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 3208 is coupled to control circuitry 3204 via peripherals interface 3216. Peripherals interface 3216 can include conventional components for establishing and maintaining communication between peripherals and. Voice and data information received by wireless circuitry 3208 (e.g., in speech recognition or voice command applications) is sent to one or more processors 3218 via peripherals interface 3216. One or more processors 3218 are configurable to process various data formats for one or more application programs 3234 stored on medium 3202.

Peripherals interface 3216 couple the input and output peripherals of device 3200 to the one or more processors 3218 and computer-readable medium 3202. One or more processors 3218 communicate with computer-readable medium 3202 via a controller 3220. Computer-readable medium 3202 can be any device or medium that can store code and/or data for use by one or more processors 3218. Computer-readable medium 3202 can include a memory hierarchy, including cache, main memory, and secondary memory. The memory hierarchy can be implemented using any combination of RAM (e.g., Standard Random Access Memory (SRAM), Dynamic Random Access Memory (DRAM), Double Data Random Access Memory (DDRAM), Read only Memory (ROM), FLASH, magnetic and/or optical storage devices, such as disk drives, magnetic tape, CDs (compact disks) and DVDs (digital video discs)). In some embodiments, peripherals interface 3216, one or more processors 3218, and controller 3220 can be implemented on a single chip, such as control circuitry 3204. In some other embodiments, they can be implemented on separate chips.

Processor(s) 3218 can include hardware and/or software elements that perform one or more processing functions, such as mathematical operations, logical operations, data manipulation operations, data transfer operations, controlling the reception of user input, controlling output of information to users, or the like. Processor(s) 3218 can be embodied as one or more hardware processors, microprocessors, microcontrollers; field programmable gate arrays (FPGAs), application-specified integrated circuits (ASICs), or the like.

Device 3200 may include storage and processing circuitry such as control circuitry 3204. Control circuitry 3204 may include storage such as hard disk drive storage, nonvolatile memory (e.g., flash memory or other electrically-programmable-read-only memory configured to form a solid-state drive), volatile memory (e.g., static or dynamic random-access-memory), etc. Processing circuitry in control circuitry 3204 may be used to control the operation of device 3200. This processing circuitry may be based on one or more microprocessors, microcontrollers, digital signal processors, baseband processor integrated circuits, application specific integrated circuits, etc.

Control circuitry 3204 may be used to run software on device 3200, such as internet browsing applications, voice-over-internet-protocol (VOIP) telephone call applications, email applications, media playback applications, operating system functions, etc. To support interactions with external equipment, control circuitry 3204 may be used in implementing communications protocols. Communications protocols that may be implemented using control circuitry 3204 include internet protocols, wireless local area network protocols (e.g., IEEE 802.11 protocols—sometimes referred to as Wi-Fi®), protocols for other short-range wireless communications links such as the Bluetooth® protocol, cellular telephone protocols, multiple-input and multiple-output (MIMO) protocols, antenna diversity protocols, satellite navigation system protocols, millimeter wave communications protocols, IEEE 802.15.4 ultra-wideband communications protocols, etc.

Device 3200 may include input/output subsystem 3206. Input/output subsystem 3206 may include input-output devices. Input/output devices may be used to allow data to be supplied to device 3200 and to allow data to be provided from device 3200 to external devices. Input/output devices may include user interface devices, data port devices, and other input-output components. For example, input/output devices may include one or more displays (e.g., touch screens or displays without touch sensor capabilities), one or more image sensors 3244 (e.g., digital image sensors), motion sensors, and speakers 3250. Input-output device may also include buttons, joysticks, scrolling wheels, touch pads, key pads, keyboards, microphones 3252, haptic elements such as vibrators and actuators, status indicators, light sources, audio jacks and other audio port components, digital data port devices, light sensors, capacitance sensors, proximity sensors (e.g., a capacitive proximity sensor and/or an infrared proximity sensor), magnetic sensors, and other sensors and input-output components.

Device 3200 also includes a power system 3242 for powering the various hardware components. Power system 3242 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 3200 includes an image sensor 3244 (e.g., a camera). In some embodiments, device 3200 includes sensors 3246. Sensors can include accelerometers, compass, gyrometer, pressure sensors, audio sensors, light sensors, barometers, and the like. Sensors 3246 can be used to sense location aspects, such as auditory or light signatures of a location.

In some embodiments, device 3200 can include a Global Positioning System (GPS) receiver, sometimes referred to as a GPS unit 3248. A mobile device can use a satellite navigation system, such as the GPS, to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 3218 run various software components stored in medium 3202 to perform various functions for device 3200. In some embodiments, the software components include an operating system 3222, a communication module 3224 (or set of instructions), a location module 3226 (or set of instructions), a ranging module 3228 that is used as part of ranging operation described herein, and other application programs 3234 (or set of instructions).

Operating system 3222 can be any suitable operating system, including iOS, Mac OS, Darwin, Quatros Real-Time Operating System (RTXC), LINUX, UNIX, OS X, WINDOWS, or an embedded operating system such as VxWorks. The operating system can include various procedures, sets of instructions, software components, and/or drivers for controlling and managing general system tasks (e.g., memory management, storage device control, power management, etc.) and facilitates communication between various hardware and software components.

Communication module 3224 facilitates communication with other devices over one or more external ports 3236 or via wireless circuitry 3208 and includes various software components for handling data received from wireless circuitry 3208 and/or external port 3236. External port 3236 (e.g., universal serial bus (USB), FireWire, Lightning connector, 60-pin connector, etc.) is adapted for coupling directly to other devices or indirectly over a network (e.g., the Internet, wireless local area network (LAN), etc.).

Location/motion module 3226 can assist in determining the current position (e.g., coordinates or other geographic location identifiers) and motion of device 3200. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 3226 receives data from GPS unit 3248 and analyzes the signals to determine the current position of the mobile device. In some embodiments, location/motion module 3226 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 3208 and is passed to location/motion module 3226. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 3200 based on the position coordinates of the corresponding transmitters. Regardless of the specific location technology used, location/motion module 3226 receives information from which a location fix can be derived, interprets that information, and returns location information, such as geographic coordinates, latitude/longitude, or other location fix data.

Ranging module 3228 can send/receive ranging messages to/from an antenna, e.g., connected to wireless circuitry 3208. The messages can be used for various purposes, e.g., to identify a sending antenna of a device, determine timestamps of messages to determine a distance of mobile device 3200 from another device. Ranging module 3228 can exist on various processors of the device, e.g., an always-on processor (AOP), a UWB chip, and/or an application processor. For example, parts of ranging module 3228 can determine a distance on an AOP, and another part of the ranging module can interact with a sharing module, e.g., to display a position of the other device on a screen in order for a user to select the other device to share a data item. Ranging module 3228 can also interact with a reminder module that can provide an alert based on a distance from another mobile device.

Dielectric-filled openings such as plastic-filled openings may be formed in metal portions of housing such as in metal sidewall structures (e.g., to serve as antenna windows and/or to serve as gaps that separate portions of antennas from each other).

Antennas may be mounted in housing. If desired, some of the antennas (e.g., antenna arrays that may implement beam steering, etc.) may be mounted under dielectric portions of device 3200 (e.g., portions of the display cover layer, portions of a plastic antenna window in a metal housing sidewall portion of housing, etc.). With one illustrative configuration, some or all of rear face of device 3200 may be formed from a dielectric. For example, the rear wall of housing may be formed from glass plastic, ceramic, other dielectric. In this type of arrangement, antennas may be mounted within the interior of device 3200 in a location that allows the antennas to transmit and receive antenna signals through the rear wall of device 3200 (and, if desired, through optional dielectric sidewall portions in housing). Antennas may also be formed from metal sidewall structures in housing and may be located in peripheral portions of device 3200.

To avoid disrupting communications when an external object such as a human hand or other body part of a user blocks one or more antennas, antennas may be mounted at multiple locations in housing. Sensor data such as proximity sensor data, real-time antenna impedance measurements, signal quality measurements such as received signal strength information, and other data may be used in determining when one or more antennas is being adversely affected due to the orientation of housing, blockage by a user's hand or other external object, or other environmental factors. Device 3200 can then switch one or more replacement antennas into use in place of the antennas that are being adversely affected.

Antennas may be mounted at the corners of housing, along the peripheral edges of housing, on the rear of housing, under the display cover layer that is used in covering and protecting display on the front of device 3200 (e.g., a glass cover layer, a sapphire cover layer, a plastic cover layer, other dielectric cover layer structures, etc.), under a dielectric window on a rear face of housing or the edge of housing, under a dielectric rear wall of housing, or elsewhere in device 3200. As an example, antennas may be mounted at one or both ends of device 3200 (e.g., along the upper and lower edges of housing, at the corners of housing, etc.).

Antennas in device 3200 may include cellular telephone antennas, wireless local area network antennas (e.g., Wi-Fi® antennas at 2.4 GHz and 5 GHz and other suitable wireless local area network antennas), satellite navigation system signals, and near-field communications antennas. The antennas may also include antennas that support IEEE 802.15.4 ultra-wideband communications protocols and/or antennas for handling millimeter wave communications. For example, the antennas may include two or more ultra-wideband frequency antennas and/or millimeter wave phased antenna arrays. Millimeter wave communications, which are sometimes referred to as extremely high frequency (EHF) communications, involve signals at 60 GHz or other frequencies between about 10 GHz and 400 GHz.

Wireless circuitry in device 3200 may support communications using the IEEE 802.15.4 ultra-wideband protocol. In an IEEE 802.15.4 system, a pair of devices may exchange wireless time stamped messages. Time stamps in the messages may be analyzed to determine the time of flight of the messages and thereby determine the distance (range) between the devices.

Image sensors 3244 may include one or more visible digital image sensors (visible-light cameras) and/or one or more infrared digital image sensors (infrared-light cameras). Image sensors 3244 may, if desired, be used to measure distances. For example, an infrared time-of-flight image sensor may be used to measure the time that it takes for an infrared light pulse to reflect back from objects in the vicinity of device 3200, which may in turn be used to determine the distance to those objects. Visible imaging systems such as a front and/or rear-facing camera in device 3200 may also be used to determine the position of objects in the environment. For example, control circuitry 3204 may use image sensors 3244 to perform simultaneous localization and mapping (SLAM). SLAM refers to the process of using images to determine the position of objections in the environment while also constructing a representation of the imaged environment. Visual SLAM techniques include detecting and tracking certain features in images such as edges, textures, room corners, window corners, door corners, faces, sidewalk edges, street edges, building edges, tree trunks, and other prominent features. Control circuitry 3204 may rely entirely upon image sensors 3244 to perform simultaneous localization and mapping, or control circuitry 3204 may synthesize image data with range data from one or more distance sensors (e.g., light-based proximity sensors). If desired, control circuitry 3204 may use display to display a visual representation of the mapped environment.

Input-output devices may include motion sensor circuitry 3246. Motion sensor circuitry 3246 may include one or more accelerometers (e.g., accelerometers that measure acceleration along one, two, or three axes), gyroscopes, barometers, magnetic sensors (e.g., compasses), image sensors (e.g., image sensor 3244) and other sensor structures. Sensors 3246 may, for example, include one or more microelectromechanical systems (MEMS) sensors (e.g., accelerometers, gyroscopes, microphones, force sensors, pressure sensors, capacitive sensors, or any other suitable type of sensor formed using microelectromechanical systems technology).

Control circuitry 3204 may be used to store and process motion sensor data. If desired, motion sensors, processing circuitry, and storage that form motion sensor circuitry may form part of a system-on-chip integrated circuit (as an example).

Input-output devices may include movement generation circuitry. Movement generation circuitry may receive control signals from control circuitry 3204. Movement generation circuitry may include electromechanical actuator circuitry that, when driven, moves device 3200 in one or more directions. For example, movement generation circuitry may laterally move device 3200 and/or may rotate device 3200 around one or more axes of rotation. Movement generation circuitry may, for example, include one or more actuators formed at one or more locations of device 3200. When driven by a motion control signal, actuators may move (e.g., vibrate, pulse, tilt, push, pull, rotate, etc.) to cause device 3200 to move or rotate in one or more directions. The movement may be slight (e.g., not noticeable or barely noticeable to a user of device 3200), or the movement may be substantial. Actuators may be based on one or more vibrators, motors, solenoids, piezoelectric actuators, speaker coils, or any other desired device capable of mechanically (physically) moving device 3200.

Some or all of movement generation circuitry such as actuators may be used to perform operations that are unrelated to rotation of device 3200. For example, actuators may include vibrators that are actuated to issue a haptic alert or notification to a user of device 3200. Such alerts may include, for example, a received text message alert identifying that device 3200 has received a text message, a received telephone call alert, a received email alert, an alarm notification alert, a calendar notification alert, or any other desired notification. By actuating actuator, device 3200 may inform the user of any desired device condition.

Motion sensor circuitry may sense motion of device 3200 that is generated by movement generation circuitry. If desired, motion sensor circuitry may provide feedback signals associated with the sensed motion of device 3200 to movement generation circuitry. Movement generation circuitry may use the feedback signals to control actuation of the movement generation circuitry.

Control circuitry 3204 may use motion sensor circuitry and/or movement generation circuitry to determine the angle of arrival of wireless signals received by device 3200 from another electronic device. For example, control circuitry 3204 may use movement generation circuitry to move device 3200 from one position to another. Motion sensor circuitry may be used to track the movement of device 3200 as it is moved between the different positions. At each position, control circuitry 3204 may receive wireless signals from another electronic device. Control circuitry 3204 may process the received wireless signals together with the motion data from motion sensor circuitry to more accurately determine the position of the other electronic device. The use of motion generation circuitry is merely illustrative, however. If desired, motion sensor circuitry may track movement of device 3200 that is not caused by motion generation circuitry. This may include a user's natural, unprompted movement of device 3200 and/or the user's movement of device 3200 after the user is prompted (by display, audio circuitry 3210, a haptic output device in device 3200, or any other suitable output device) to move device 3200 in a particular fashion.

Other sensors that may be included in input-output devices include ambient light sensors for gathering information on ambient light levels, proximity sensor components (e.g., light-based proximity sensors, capacitive proximity sensors, and/or proximity sensors based on other structures), depth sensors (e.g., structured light depth sensors that emit beams of light in a grid, a random dot array, or other pattern, and that have image sensors that generate depth maps based on the resulting spots of light produced on target objects), sensors that gather three-dimensional depth information using a pair of stereoscopic image sensors, LIDAR (light detection and ranging) sensors, radar sensors, and other suitable sensors.

Input-output circuitry may include wireless communications circuitry for communicating wirelessly with external equipment. Wireless communications circuitry may include radio frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

Wireless communications circuitry 3208 may include radio-frequency transceiver circuitry for handling various radio-frequency communications bands. For example, wireless circuitry 3208 may include transceiver circuitry.

Transceiver circuitry may be wireless local area network transceiver circuitry. Transceiver circuitry may handle 2.4

GHz and 5 GHz bands for Wi-Fi® (IEEE 802.11) communications and may handle the 2.4 GHz Bluetooth® communications band.

Circuitry may use cellular telephone transceiver circuitry for handling wireless communications in frequency ranges such as a communications band from 700 to 960 MHz, a band from 1710 to 2170 MHz, a band from 2300 to 2700 MHz, other bands between 700 and 2700 MHz, higher bands such as LTE bands 42 and 43 (3.4-3.6 GHz), or other cellular telephone communications bands. Circuitry may handle voice data and non-voice data.

Millimeter wave transceiver circuitry (sometimes referred to as extremely high frequency transceiver circuitry) may support communications at extremely high frequencies (e.g., millimeter wave frequencies such as extremely high frequencies of 10 GHz to 400 GHz or other millimeter wave frequencies). For example, circuitry may support IEEE 802.11ad communications at 60 GHz. Circuitry may be formed from one or more integrated circuits (e.g., multiple integrated circuits mounted on a common printed circuit in a system-in-package device, one or more integrated circuits mounted on different substrates, etc.).

Ultra-wideband transceiver circuitry may support communications using the IEEE 802.15.4 protocol and/or other wireless communications protocols. Ultra-wideband wireless signals may be characterized by bandwidths greater than 500 MHz or bandwidths exceeding 20% of the center frequency of radiation. The presence of lower frequencies in the baseband may allow ultra-wideband signals to penetrate through objects such as walls. Transceiver circuitry may operate in a 2.4 GHz frequency band, a 6.5 GHz frequency band, an 8 GHz frequency band, and/or at other suitable frequencies.

Wireless communications circuitry may include satellite navigation system circuitry such as Global Positioning System (GPS) receiver circuitry for receiving GPS signals at 3275 MHz or for handling other satellite positioning data (e.g., GLONASS signals at 1609 MHz). Satellite navigation system signals for receiver are received from a constellation of satellites orbiting the earth.

In satellite navigation system links, cellular telephone links, and other long-range links, wireless signals are typically used to convey data over thousands of feet or miles. In Wi-Fi® and Bluetooth® links at 2.4 and 5 GHz and other short-range wireless links, wireless signals are typically used to convey data over tens or hundreds of feet. Extremely high frequency (EHF) wireless transceiver circuitry may convey signals over these short distances that travel between transmitter and receiver over a line-of-sight path. To enhance signal reception for millimeter wave communications, phased antenna arrays and beam steering techniques may be used (e.g., schemes in which antenna signal phase and/or magnitude for each antenna in an array is adjusted to perform beam steering). Antenna diversity schemes may also be used to ensure that the antennas that have become blocked or that are otherwise degraded due to the operating environment of device 3200 can be switched out of use and higher-performing antennas used in their place.

Wireless communications circuitry can include circuitry for other short-range and long-range wireless links if desired. For example, wireless communications circuitry 36 may include circuitry for receiving television and radio signals, paging system transceivers, near field communications (NFC) circuitry, etc.

The one or more applications 3234 on device 3200 can include any applications installed on the device 3200, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or advanced audio codec (AAC) files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations, and the like) on a display surface. In another example, a timer module can be a software timer. The timer module can also be implemented in hardware. The time module can maintain various timers for any number of events.

I/O subsystem 3206 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 3206 can include a display and user input devices such as a keyboard, mouse, and/or trackpad. In some embodiments, I/O subsystem 3206 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 3202) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 3206 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 3200 can include a touchpad (not shown) for activating or deactivating particular functions. In some embodiments, the touchpad is a touch-sensitive area of the device 3200 that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a solid state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data available from specific and legitimate sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which devices ranging operations may be performed. Further, other uses for personal information data that benefit the user are also contemplated by the present disclosure. For instance, health and fitness data may be shared to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence, different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or" unless specifically indicated to the contrary. Reference to a "first" component does not necessarily require that a second component be provided. Moreover, reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer program product (e.g. a hard drive or an entire computer system), and may be present on or within different computer program products within a system or network. A computer system may include a monitor, printer, or other suitable display for providing any of the results mentioned herein to a user.

The specific details of particular embodiments may be combined in any suitable manner or varied from those shown and described herein without departing from the spirit and scope of embodiments of the invention.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

All publications, patents, and patent applications cited herein are hereby incorporated by reference in their entirety for all purposes.

What is claimed is:

1. An electronic device, comprising:
    a first display coupled to a second display via a hinged connection;
    an acceleration sensor configured to detect a drop of the electronic device from a vertical acceleration of the electronic device exceeding a predetermined vertical acceleration threshold; and
    a release mechanism operating with the hinged connection to automatically reduce an angle between the first display and the second display below a threshold angle without reducing the angle between the first display and the second display to zero degrees when the predetermined vertical acceleration threshold is exceeded.

2. The electronic device of claim 1, wherein the release mechanism comprises a motorized hinge.

3. The electronic device of claim 1, wherein the release mechanism comprises a mechanical hinge with a spring-loaded detent.

4. The electronic device of claim 1, wherein the threshold angle is less than 180 degrees.

5. The electronic device of claim 1, wherein the first display or the second display is an organic light emitting diode display.

6. The electronic device of claim 1, wherein the first display and the second display each comprise regions of a foldable display.

7. The electronic device of claim 1, wherein the acceleration sensor comprises an inertial measurement unit.

8. A method, comprising:
    detecting a drop of an electronic device from a vertical acceleration of the electronic device;
    comparing a value of the vertical acceleration of the electronic device against a predetermined threshold; and
    activating a release mechanism for a hinged connection between a first display and a second display of the electronic device when the value of the vertical acceleration exceeds the predetermined threshold, wherein the activating reduces an angle between the first display and the second display below a threshold angle without reducing the angle between the first display and the second display to zero degrees.

9. The method of claim 8, wherein the release mechanism comprises a motorized hinge.

10. The method of claim 8, wherein the release mechanism comprises a mechanical hinge with a spring-loaded detent.

11. The method of claim 8, wherein the threshold angle is less than 180 degrees.

12. The method of claim 8, wherein the first display or the second display is an organic light emitting diode display.

13. The method of claim 8, wherein the first display and the second display each comprise regions of a foldable display.

* * * * *